(12) United States Patent
Koide

(10) Patent No.: US 9,979,594 B2
(45) Date of Patent: May 22, 2018

(54) METHODS, APPARATUSES, AND SYSTEMS FOR CONTROLLING COMMUNICATION NETWORKS

(71) Applicant: NEC Corporation, Tokyo (JP)

(72) Inventor: Toshio Koide, Tokyo (JP)

(73) Assignee: NEC Corporation, Tokyo (JP)

( * ) Notice: Subject to any disclaimer, the term of this patent is extended or adjusted under 35 U.S.C. 154(b) by 86 days.

(21) Appl. No.: 14/427,507

(22) PCT Filed: Sep. 12, 2013

(86) PCT No.: PCT/JP2013/005428
§ 371 (c)(1),
(2) Date: Mar. 11, 2015

(87) PCT Pub. No.: WO2014/041814
PCT Pub. Date: Mar. 20, 2014

(65) Prior Publication Data
US 2015/0222483 A1   Aug. 6, 2015

(30) Foreign Application Priority Data
Sep. 13, 2012   (JP) .................. 2012-202114

(51) Int. Cl.
*H04L 12/28* (2006.01)
*H04L 12/24* (2006.01)
(Continued)

(52) U.S. Cl.
CPC ...... *H04L 41/0806* (2013.01); *H04L 41/0816* (2013.01); *H04L 41/0893* (2013.01);
(Continued)

(58) Field of Classification Search
CPC ............ H04L 41/0806; H04L 41/0816; H04L 41/0893; H04L 41/12; H04L 41/22; H04L 43/026; H04L 45/02; H04L 47/10
See application file for complete search history.

(56) References Cited

U.S. PATENT DOCUMENTS

| 9,137,122 B2* | 9/2015 | Kitano | G06F 17/30958 |
| 2004/0246973 A1* | 12/2004 | Hoang | H04L 45/02 370/395.21 |
| 2013/0003745 A1* | 1/2013 | Nishimura | H04L 12/4641 370/400 |

FOREIGN PATENT DOCUMENTS

| JP | 2000-022734 A | 1/2000 |
| WO | WO 2011/118585 A1 | 9/2011 |

OTHER PUBLICATIONS

International Search Report in PCT/JP2013/005428 dated Dec. 17, 2013.
(Continued)

*Primary Examiner* — Mounir Moutaouakil
(74) *Attorney, Agent, or Firm* — Finnegan, Henderson, Farabow, Garrett & Dunner, L.L.P.

(57) ABSTRACT

A control apparatus includes: a database which stores control information for controlling a network; an interface unit which is connectable to a plurality of modules, each of which operates the control information based on a predetermined algorithm, and which operates the control information responsive to a database operation command issued by any one of the modules; and a control unit which controls packet processing in the network based on the control information configured by an operation executed by any one of the modules. The interface unit updates the control information responsive to a database operation command corresponding to information input/output or information deletion with respect to the control information.

10 Claims, 42 Drawing Sheets

(51) Int. Cl.
*H04L 12/801* (2013.01)
*H04L 12/26* (2006.01)
*H04L 12/751* (2013.01)

(52) U.S. Cl.
CPC .............. *H04L 41/12* (2013.01); *H04L 47/10* (2013.01); *H04L 41/22* (2013.01); *H04L 43/026* (2013.01); *H04L 45/02* (2013.01)

(56) References Cited

OTHER PUBLICATIONS

Nick McKeown, et al., "OpenFlow: Enabling Innovation in Campus Networks," [online], [searched on Jul. 13, 2012], Internet <Url:http://www.openflow.org/documents/openflow-wp-latest.pdf>.
"OpenFlow Switch Specification" Version 1.0.0 Implemented (Wire Protocol 0x01), [online], [searched on Jul. 13, 2012], Internet <URL:http://www.openflow.org/documents/openflow-spec-v1.0.0.pdf>.
Nick McKeown, et al., "OpenFlow: Enabling Innovation in Campus Networks," Mar. 14, 2008, pp. 1-6, http://www.openflow.org/documents/openflow-wp-latest.pdf.

* cited by examiner

Fig. 3

- TOPOLOGY INFORMATION
  - NODE INFORMATION
  - LINK INFORMATION

- PACKET PROCESSING INFORMATION
  - FLOW INFORMATION
    - MATCHING CONDITION
    - Path INFORMATION
    - PROCESSING INFORMATION

- PACKET INFORMATION
  - INPUT PACKET INFORMATION
  - OUTPUT PACKET INFORMATION

NETWORK TOPOLOGY

| Key | Value |
|---|---|
| /nodes | {1,2,3,4...} |
| /nodes/[node_id] | {DPID, Vendor, Serial No,....} |
| /nodes/[node_id]/ports | {1,2,3,4,....} |
| /nodes/[node_id]/ports/[port_id] | {State, Bandwidth,...} |
| /links | {1,2,3,4,...} |
| /links/[link_id] | {src_node_id, src_port_id, dst_node_id, dst_port_id,...} |

INPUT AND OUTPUT PACKETS

| Key | Value |
|---|---|
| /packets/in | {1,2,3,4,...} |
| /packets/in/[packet_id] | {packet_id, received time, node_id, port_id, ...} |
| /packets/out | {1,2,3,4,...} |
| /packets/out/[packet_id] | {node_id, port_id, packet_data, ...} |

Fig. 10

EXAMPLES OF DB OPERATION COMMANDS

INFORMATION INPUT/OUTPUT COMMANDS:
- get(key)
  - ACQUIRE VALUE ASSOCIATED WITH KEY
- put(key, value)
  - SET VALUE ASSOCIATED WITH KEY
- push_head(key, value)
  - ADD VALUE TO TOP OF LIST ASSOCIATED WITH KEY
- push_tail(key, value)
  - ADD VALUE TO END OF LIST ASSOCIATED WITH KEY
- push_at(key, position, value)
  - INSERT VALUE INTO SPECIFIED POSITION OF LIST ASSOCIATED WITH KEY
  - position CAN BE SPECIFIED NOT ONLY BY POSITION BUT ALSO BY KEY VALUE
- pop_head(key)
  - ACQUIRE AND DELETE VALUE FROM TOP OF LIST ASSOCIATED WITH KEY
- pop_tail(key)
  - ACQUIRE AND DELETE VALUE FROM END OF LIST ASSOCIATED WITH KEY
- pop_at(key, position)
  - ACQUIRE AND DELETE VALUE FROM SPECIFIED POSITION OF LIST ASSOCIATED WITH KEY
  - position CAN BE SPECIFIED NOT ONLY BY POSITION BUT ALSO BY KEY VALUE

Fig. 11

EXAMPLES OF DB OPERATION COMMANDS

NOTIFICATION SUBSCRIPTION COMMAND :
- subscribe(key_pattern)
    — GIVE INSTRUCTION TO BE NOTIFIED WHEN OPERATION MATCHING SPECIFIED PATTERN IS EXECUTED
- unsubscribe(key_pattern)
    — CANCEL NOTIFICATION SUBSCRIPTION COMMAND INFORMATION DELETION COMMAND :
- delete(key)
    — DELETE KEY AND VALUE ASSOCIATED WITH KEY

Fig. 29

| Key | Value |
|---|---|
| /nodes | [1,2,3,4,5] |
| /nodes/1 | {NODE ID (A)} |
| /nodes/2 | {NODE ID (B)} |
| /nodes/3 | {NODE ID (C)} |
| /nodes/4 | {NODE ID (D)} |
| /nodes/5 | {NODE ID (E)} |
| /links | [1,2,3,4,5,6,7] |
| /links/1 | {src_node:A, dst_node: B, ...} |
| /links/2 | {src_node:A, dst_node: C, ...} |
| /links/3 | {src_node:C, dst_node: D, ...} |
| /links/4 | {src_node:D, dst_node: B, ...} |
| /links/5 | {src_node:B, dst_node: E, ...} |
| /links/6 | {src_node:D, dst_node: E, ...} |

Fig. 30

| Key | Value |
|---|---|
| /nodes | {1,2,3} |
| /nodes/1 | {NODE ID (a), original(A, B)} |
| /nodes/2 | {NODE ID (b), original(C, D)} |
| /nodes/3 | {NODE ID (c), original(E)} |
| /links | {1,2,3} |
| /links/1 | {src_node:A, dst_node: C, ... }, {src_node:D, dst_node: B, ...} |
| /links/2 | {src_node:B, dst_node: E, ...} |
| /links/3 | {src_node:D, dst_node: E, ...} |

Fig. 32
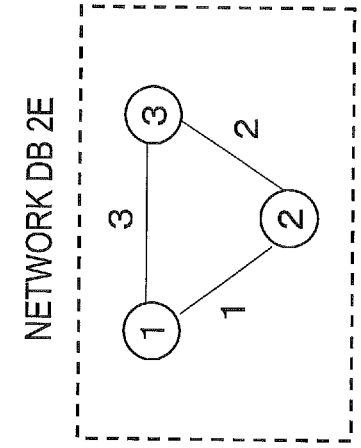
NETWORK DB 2E
| Key | Value |
|---|---|
| /nodes | {1,2,3} |
| /nodes/1 | {NODE ID(a)} |
| /nodes/2 | {NODE ID(b)} |
| /nodes/3 | {NODE ID(c)} |
| /links | {1,2,3} |
| /links/1 | {src:a, dst:b} |
| /links/2 | {src:b, dst:c} |
| /links/3 | {src:c, dst:a} |
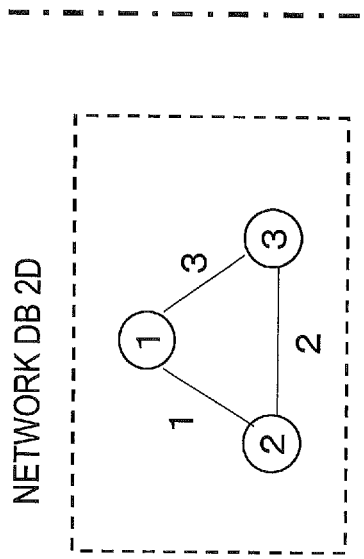
NETWORK DB 2D
| Key | Value |
|---|---|
| /nodes | {1,2,3} |
| /nodes/1 | {NODE ID(A)} |
| /nodes/2 | {NODE ID(B)} |
| /nodes/3 | {NODE ID(C)} |
| /links | {1,2,3} |
| /links/1 | {src:A, dst:B} |
| /links/2 | {src:B, dst:C} |
| /links/3 | {src:C, dst:A} |

Fig. 33

NETWORK DB 2F

| Key | Value |
|---|---|
| /nodes | {1,2,3,4,5,6} |
| /nodes/1 | {NODE ID(1)} |
| /nodes/2 | {NODE ID(2)} |
| ... | ... |
| /links | {1,2,3,4,5,6,7} |
| /links/1 | {src:1, dst:2} |
| ... | ... |
| /links/3 | {src:C, dst:A} |

METHODS, APPARATUSES, AND SYSTEMS FOR CONTROLLING COMMUNICATION NETWORKS

TECHNICAL FIELD

CROSS-REFERENCE TO RELATED APPLICATIONS

The present invention is based upon and claims the benefit of the priority of Japanese patent application No. 2012-202114, filed on Sep. 13, 2012, the disclosure of which is incorporated herein in its entirety by reference thereto.

The present invention relates to a network control apparatus, a method of setting the network control apparatus, and a program. In particular, it relates to: a network control apparatus controlling a group of switches managed thereby in a central manner; a method of setting the network control apparatus; and a program.

BACKGROUND

In recent years, a technique referred to as OpenFlow has been proposed (see non patent literature (NPL) 1 and 2). OpenFlow recognizes communications as end-to-end flows and performs path control, failure recovery, load balancing, and optimization on a per-flow basis. An OpenFlow switch according to NPL 2 has a secure channel for communication with an OpenFlow controller and operates according to a flow table suitably added or rewritten by the OpenFlow controller. In a flow table, a set of the following three is defined for each flow: matching conditions (Match Fields) against which a packet header is matched; flow statistical information (Counters); and Instructions that define processing contents (see section "4.1 Flow Table" in NPL 2).

For example, when receiving a packet, the OpenFlow switch searches the flow table for an entry having a matching condition (see "4.3 Match Fields" in NPL 2) that matches header information of the incoming packet. If, as a result of the search, the OpenFlow switch finds an entry matching the incoming packet, the OpenFlow switch updates the flow statistical information (Counters) and processes the incoming packet based on a processing content (packet transmission from a specified port, flooding, drop, etc.) written in the Instructions field of the entry. If, as a result of the search, the OpenFlow switch does not find an entry matching the incoming packet, the OpenFlow switch transmits an entry setting request (Packet-In message) to the OpenFlow controller via the secure channel. Namely, the OpenFlow switch requests the OpenFlow controller to transmit control information for processing the incoming packet. The OpenFlow switch receives a flow entry defining a processing content and updates the flow table. In this way, by using an entry stored in the flow table as control information, the OpenFlow switch executes packet forwarding.

[NPL 1]
Nick McKeown, and seven others, "OpenFlow: Enabling Innovation in Campus Networks,"[online], [searched on Jul. 13, 2012], Internet <URL:http://www.openflow.org/documents/openflow-wp-latest.pdf>

[NPL 2]
"OpenFlow Switch Specification" Version 1.0.0 Implemented (Wire Protocol 0x01), [online], [searched on Jul. 13, 2012], Internet <URL:http://www.openflow.org/documents/openflow-spec-v1.0.0.pdf>

SUMMARY

The following analysis has been given by the present invention. In a central-control-type network as typified by OpenFlow in the above NPL 1 and 2, detailed control can be executed. However, to cause a control apparatus corresponding to the OpenFlow controller in the above NPL 1 and 2 to execute an intended operation, an operator is required to program a control operation of the controller. Programming of the controller requires advanced knowledge and skill such as for management of a network configuration, programming, and configuration of a test environment, in addition to basic specifications of NPL 2.

For example, to configure the OpenFlow controller in NPL 2, various items need to be set and programmed, including association between each switch and a control channel, topology search by LLDP (Link Layer Discovery Protocol), path calculation, setting of flow entries in a plurality of switches on a path, and management of input/output packets per switch. For example, to execute programming, an enormous amount of knowledge and skill is required, such as about API (Application Programming Interface) relating to topology management and path calculation, many functions relating to API, and arguments that need to be given to these functions.

Thus, even if devices of a central-control-type network are installed, users may not be able to sufficiently utilize the control flexibility.

It is an object of the present invention to provide: a network control apparatus that can improve the setting easiness (configuration easiness) of a central-control-type network without detriment to the control flexibility thereof; a method of setting the network control apparatus; and a program.

According to a first aspect, there is provided a control apparatus controlling a network. The control apparatus comprises: a database which stores control information for controlling the network; an interface unit which is connectable to a plurality of modules, each of which operates the control information based on a predetermined algorithm, and which operates the control information responsive to a database operation command issued by any one of the modules; and a control unit which controls packet processing in the network based on the control information configured by an operation executed by any one of the modules. The interface unit updates the control information responsive to a database operation command corresponding to information input/output or information deletion with respect to the control information.

According to a second aspect, there is provided a control method of a control apparatus controlling a network. The control method comprises: storing control information for controlling the network in a database; operating the control information responsive to a database operation command issued by any one of a plurality of modules, each of which operates the control information based on a predetermined algorithm; updating the control information responsive to a database operation command corresponding to information input/output or information deletion with respect to the control information; and controlling packet processing in the network based on the control information configured by an operation executed by any one of the modules. This method is associated with a certain machine, that is, with the control apparatus controlling the network by using the database and modules.

According to a third aspect, there is provided a communication system comprising a control apparatus controlling a network. The control apparatus comprises: a database which stores control information for controlling the network; an interface unit which is connectable to a plurality of modules, each of which operates the control information based on a predetermined algorithm, and which operates the control information responsive to a database operation command issued by any one of the modules; and a control unit which controls packet processing in the network based on the control information configured by an operation executed by any one of the modules. The interface unit updates the control information responsive to a database operation command corresponding to information input/output or information deletion with respect to the control information.

According to a fourth aspect, there is provided a program causing a control apparatus controlling a network to execute processes of: storing control information for controlling the network in a database; operating the control information responsive to a database operation command issued by any one of a plurality of modules, each of which operates the control information based on a predetermined algorithm; updating the control information responsive to a database operation command corresponding to information input/output or information deletion with respect to the control information; and controlling packet processing in the network based on the control information configured by an operation executed by any one of the modules. This program can be recorded in a computer-readable (non-transient) storage medium. Namely, the present invention can be embodied as a computer program product.

According to the present invention, the setting easiness (configuration easiness) of a central-control-type network can be improved, without detriment to the control flexibility thereof.

BRIEF DESCRIPTION OF THE DRAWINGS

FIG. 3 illustrates a configuration of a network DB according to the first exemplary embodiment of the present disclosure.

FIG. 10 illustrates database operation commands (DB operation commands) used in the second exemplary embodiment of the present disclosure.

FIG. 11 illustrates database operation commands (DB operation commands) used in the second exemplary embodiment of the present disclosure.

FIG. 29 illustrates an operation of network DBs by an aggregation logic unit according to the seventh exemplary embodiment of the present disclosure.

FIG. 30 illustrates an operation of network DBs by an aggregation logic unit according to the seventh exemplary embodiment of the present disclosure.

FIG. 32 illustrates an operation of network DBs by an integration logic unit according to the eighth exemplary embodiment of the present disclosure.

FIG. 33 illustrates an operation of a network DB by the integration logic unit according to the eighth exemplary embodiment of the present disclosure.

PREFERRED MODES

<First Exemplary Embodiment>

According to a first exemplary embodiment of the present disclosure, a control apparatus can control a network in a central manner by operating a DB (Database) storing control information about a configuration of the network and a method of processing packets in the network, for example. For example, the DB is configured by Key-Value stores and is operated through predetermined DB operation commands. The DB can be operated through simple operation commands such as commands for inputting and outputting information to and from the DB and a command for deleting information in the DB. In the first exemplary embodiment, the control apparatus can be configured by combining modules that operate the DB through operation commands. Thus, the control apparatus according to the first exemplary embodiment can be programmed through simple DB operation commands, without using API or many functions relating thereto.

Figure 1:
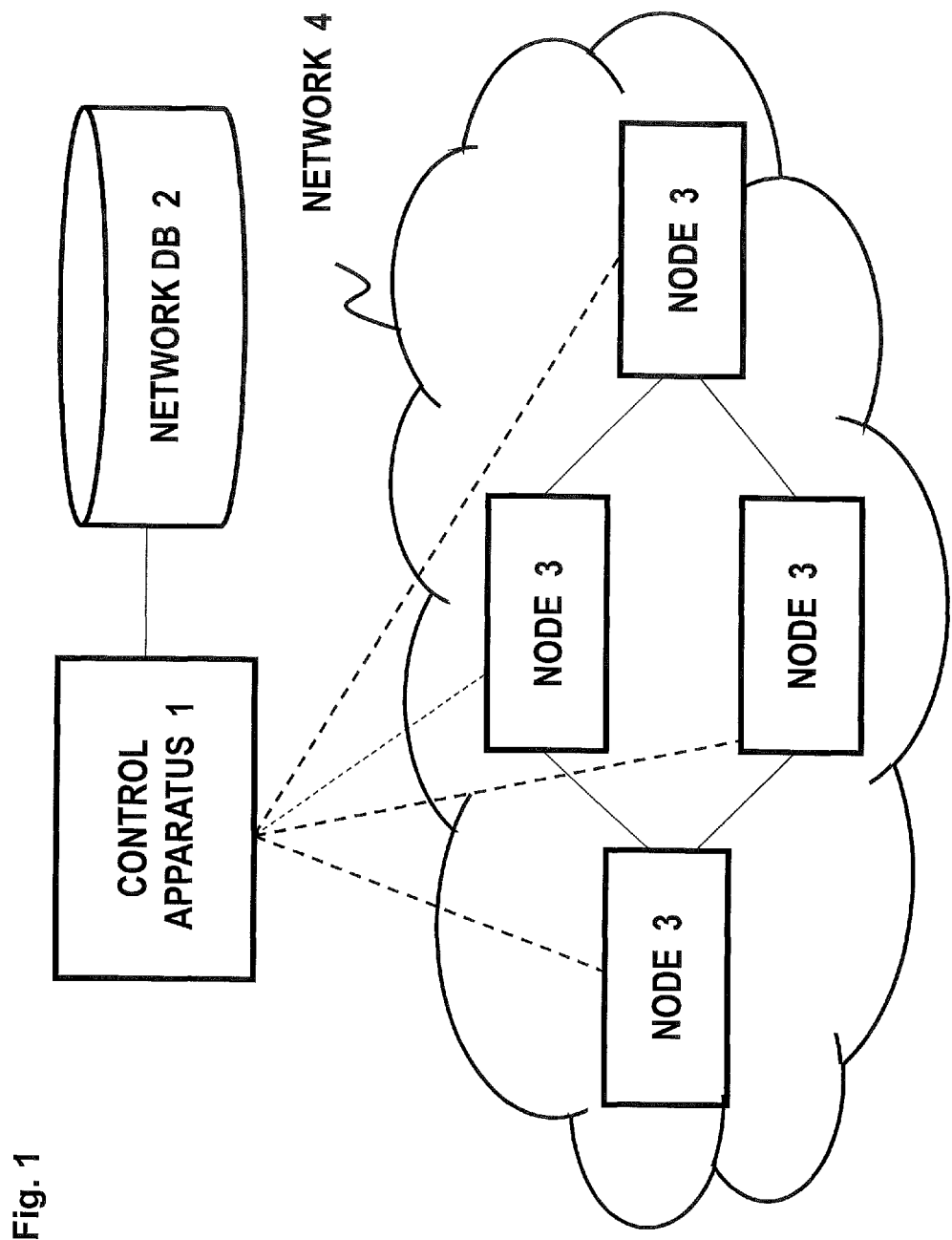
FIG. 1 illustrates a configuration of a system according to a first exemplary embodiment of the present disclosure.

Next, the first exemplary embodiment will be described in detail with reference to drawings. FIG. 1 illustrates a configuration of a communication system according to the first exemplary embodiment of the present disclosure. In FIG. 1, the communication system is configured by a control apparatus 1, a network DB 2, and a network 4 including a plurality of nodes 3.

The control apparatus 1 controls the network 4 in a central manner by operating the network DB 2.

Each node 3 in the network 4 processes a packet in accordance with the control apparatus 1.

For example, the network DB 2 is a database configured by Key-Value stores. For example, the network DB 2 stores identification information (Key) and data (Value) in pairs. In the network DB 2, identification information (Key) is set per data (Value).

Figure 2:
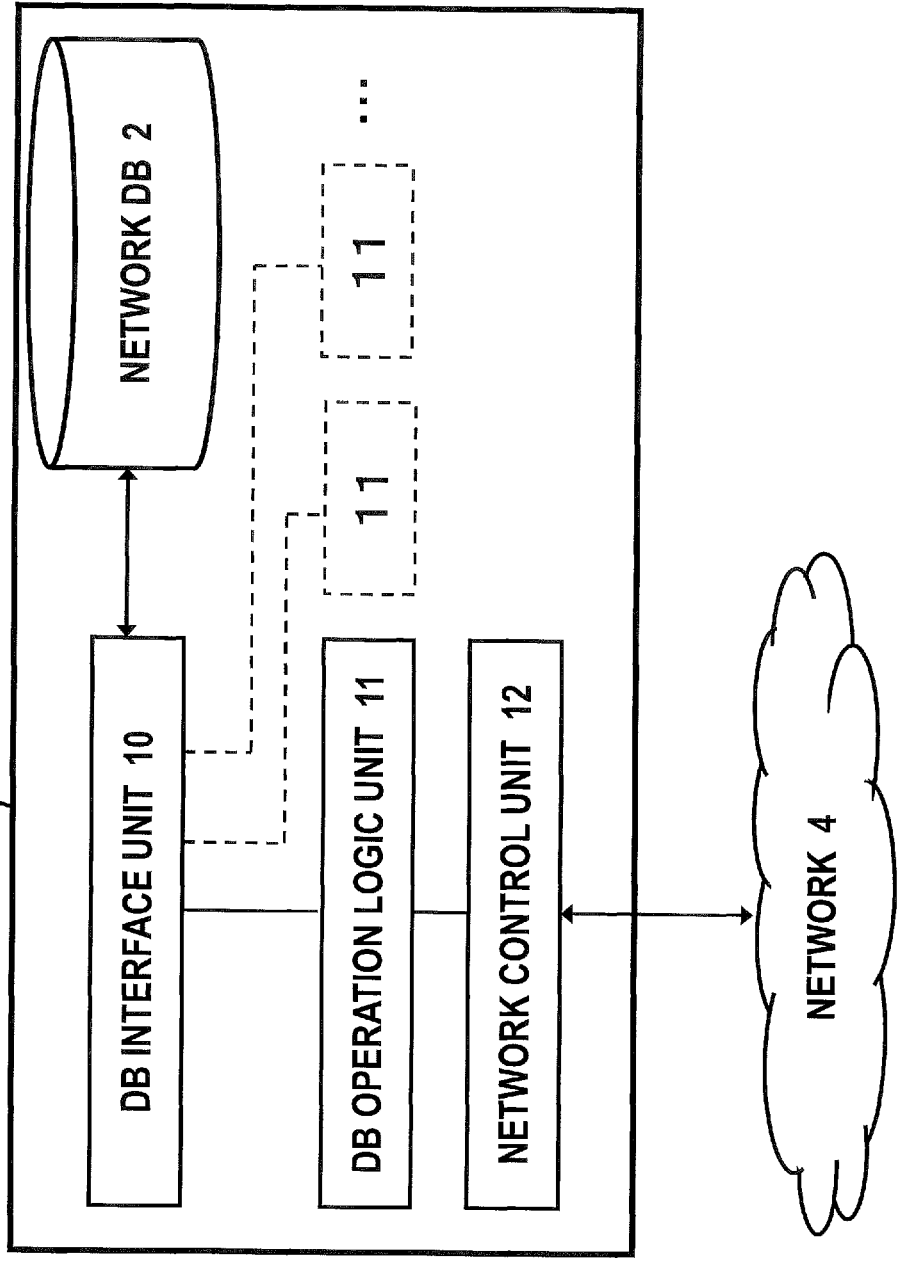
FIG. 2 illustrates a configuration of a control apparatus according to the first exemplary embodiment of the present disclosure.

FIG. 2 illustrates a configuration of the control apparatus 1. In FIG. 2, the control apparatus 1 includes a DB operation logic unit 11, a network control unit 12, and a DB interface unit 10 connected to the network DB 2.

The DB interface unit 10 has a function of operating the network DB 2 by using predetermined DB operation commands issued by the DB operation logic unit 11. Alternatively, the control apparatus 1 can be configured by combining a plurality of DB operation logic units 11. Thus, the DB interface unit 10 can be connected to a plurality of DB operation logic units 11 (portions indicated by dashed lines in FIG. 2). The DB interface unit 10 can operate the network DB 2 by using commands issued from the plurality of DB operation logic units 11. The DB interface unit 10 can configure information based on a combination of a plurality of DB operation logic units 11 in the network DB 2. Namely, an operator can easily change a configuration of the network DB 2 by changing the combination of the DB operation logic units 11 connected to the DB interface unit 10. Thus, an operator can easily configure the control apparatus 1 suitable to a type of the network 4 or to a communication protocol used in the network 4.

Examples of the commands for operating the network DB 2 will be listed below. However, since the following commands are examples, the DB operation commands according to the present disclosure are not limited to the following examples.

Information input/output command
Information deletion command
Notification subscription command An information input/output command is used for inputting information to the network DB 2. In addition, an information input/output command is used for acquiring information from the network DB 2. For example, the DB interface unit 10 uses a command "get(key)" to acquire data (Value) corresponding to identification information (key) from the network DB 2. In addition, the DB interface unit 10 uses a command "put(key, value)" to input data (value) corresponding to identification information (Key) to the network DB 2. If data (Value) is listed, the DB interface unit 10 may use a command "push(key, value)" or a command "pop(key)" to execute input or output of data (Value). Namely, data may be used as a queue or a stack.

The information deletion command is used for deleting information from the network DB 2. For example, the DB interface unit 10 uses a command "delete(key)" to delete data (value) corresponding to identification information (key) from the network DB 2.

For example, the notification subscription command is used for subscription. With this command, if an operation corresponding to specified identification information (key) is executed on the network DB 2, the network DB 2 notifies the DB interface unit 10 of data (value) corresponding to the identification information (key). For example, the DB interface unit 10 transmits a command "subscribe(key)" to the network DB 2, and if an operation corresponding to identification information (key) is executed, the DB interface unit 10 receives data (value) corresponding to the identification information (key) from the network DB 2. A key pattern such as a wildcard or a regular expression may be used for the identification information. For example, the network DB 2 uses a command "publish(key, value, op)" to notify the DB interface unit 10 of data (value) corresponding to the identification information. An operation (including put/get/delete) corresponding to the key can be included in the "op". After notified, the DB operation logic unit 11 can recognize addition, acquisition, or deletion of a key corresponding to identification information.

A plurality of DB operation logic units 11 may share common DB operation commands. By allowing a plurality of DB operation logic units 11 to operate the network DB 2 with common commands, a network operator can easily extend the DB operation logic units 11. Namely, when adding a DB operation logic unit 11 having a new function to the control apparatus 1, an operator does not need to newly design an interface between the DB operation logic unit 11 and the network DB 2.

The DB operation logic unit 11 has a function of operating information stored in the network DB 2 based on a predetermined algorithm defined based on a type of the DB operation logic unit 11. For example, the DB operation logic unit 11 has a function of inputting information acquired from the network 4 to the network DB 2 via the DB interface unit 10.

The network control unit 12 has a function of controlling the network 4 based on the network DB 2 configured by an operation of the DB operation logic unit 11. For example, the network control unit 12 can change methods of controlling the network 4, depending on a communication protocol used in the network 4.

FIG. 3 illustrates a configuration of the network DB 2. This configuration in FIG. 3 is an example, and therefore, the configuration of the network DB 2 is not limited to the configuration in FIG. 3.

For example, the network DB 2 includes information about the topology of the network 4 (topology information), information about a packet processing method (packet processing information), and information about a packet (packet information).

For example, the topology information includes information about each node 3 that exists in the network 4 (node information) and information about a link between each node pair (link information). For example, the node information includes information about identifiers and communication ports of the nodes 3. For example, the link information includes identifiers of the links, identifiers of the nodes 3 connected to the links, and identifiers of communication ports of the nodes 3 connected to the links.

The packet processing information includes flow information. The flow information is information about a flow to which packets belong. A flow signifies a group of communication packets having a predetermined attribute (an attribute that can be identified based on a communication destination, source, or the like). For example, the flow information includes a matching condition, Path information, and processing information. For example, the matching condition represents a condition for identifying packets corresponding to the flow information. For example, the Path information represents a path through which packets belonging to the flow matching the matching condition travel. For example, the processing information represents a process to be executed on packets that travel through the path corresponding to the Path information (for example, rewriting of header information).

The packet information includes input packet information and output packet information. The input packet information is a packet that does not match a matching condition in any flow information among the packets received from the network 4. The output packet information is a packet that needs to be outputted from the network 4.

For example, the topology information, the packet processing information, and the input packet information stored in the network DB 2 may be standardized in predetermined format. By standardizing the information stored in the network DB 2, the network DB 2 can have compatibility with networks that comply with various protocols.

Figure 4:
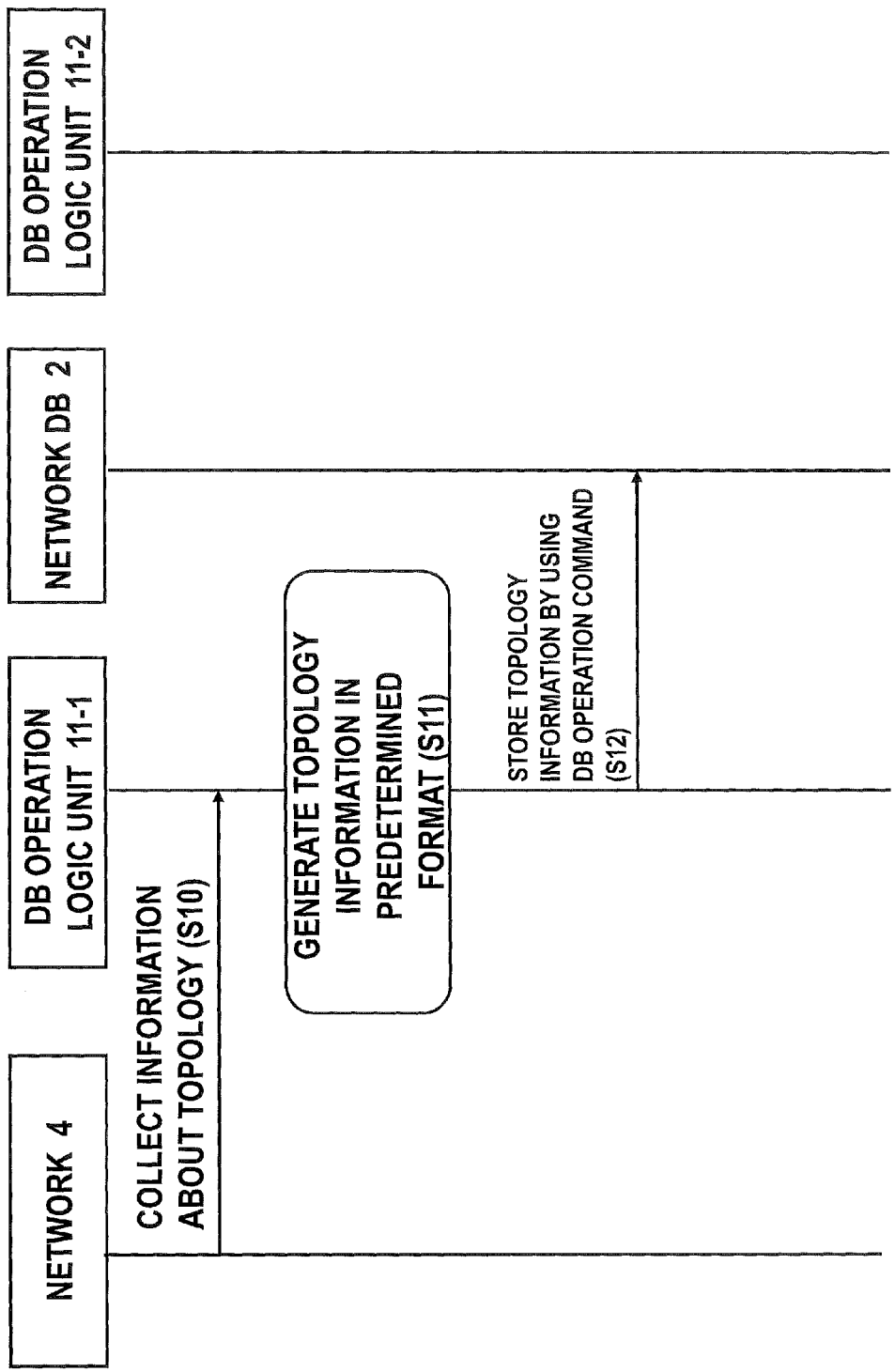
FIG. 4 is a sequence diagram illustrating an operation according to the first exemplary embodiment of the present disclosure.
Figure 5:
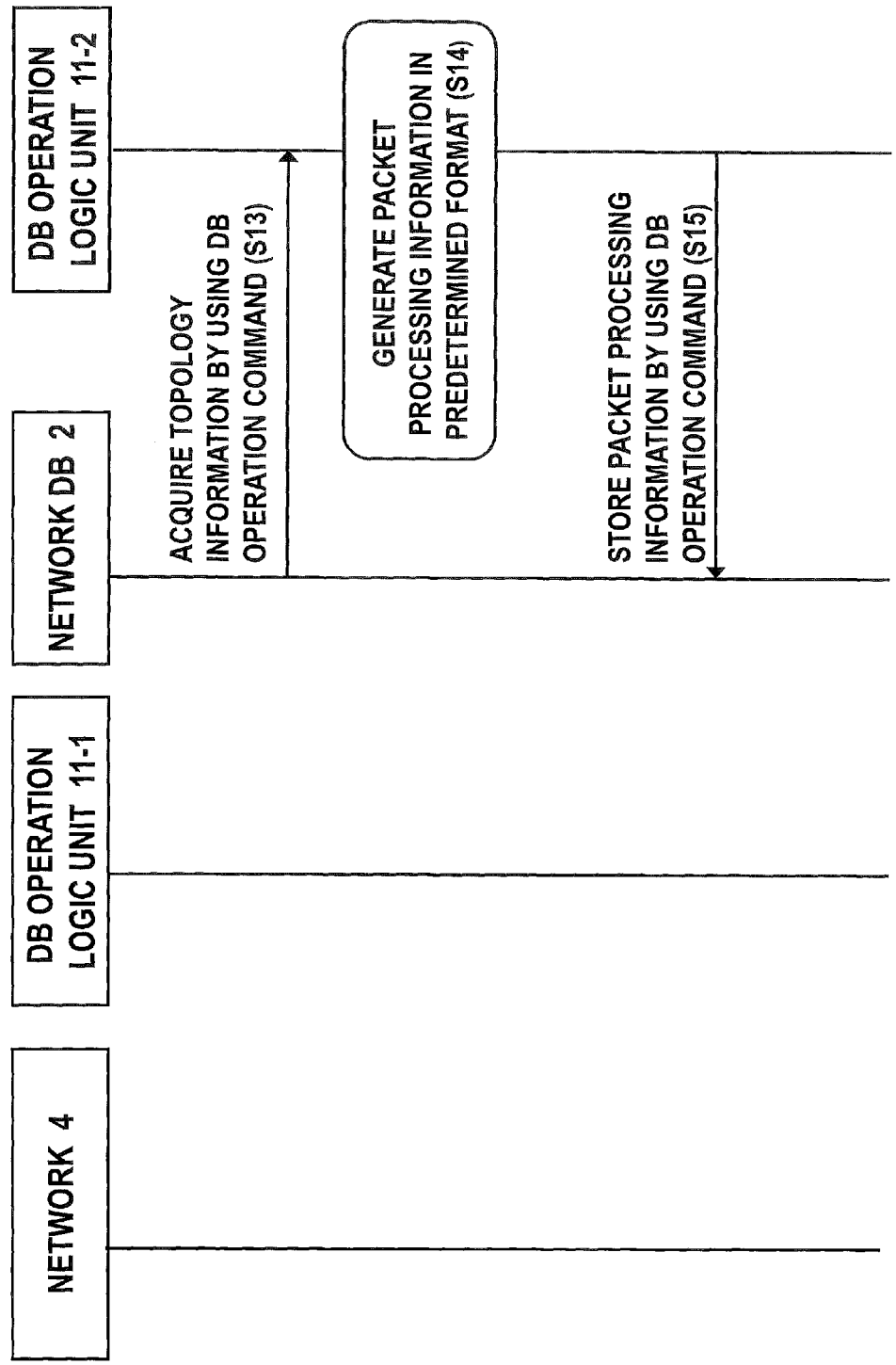
FIG. 5 is a sequence diagram illustrating an operation according to the first exemplary embodiment of the present disclosure.
Figure 6:
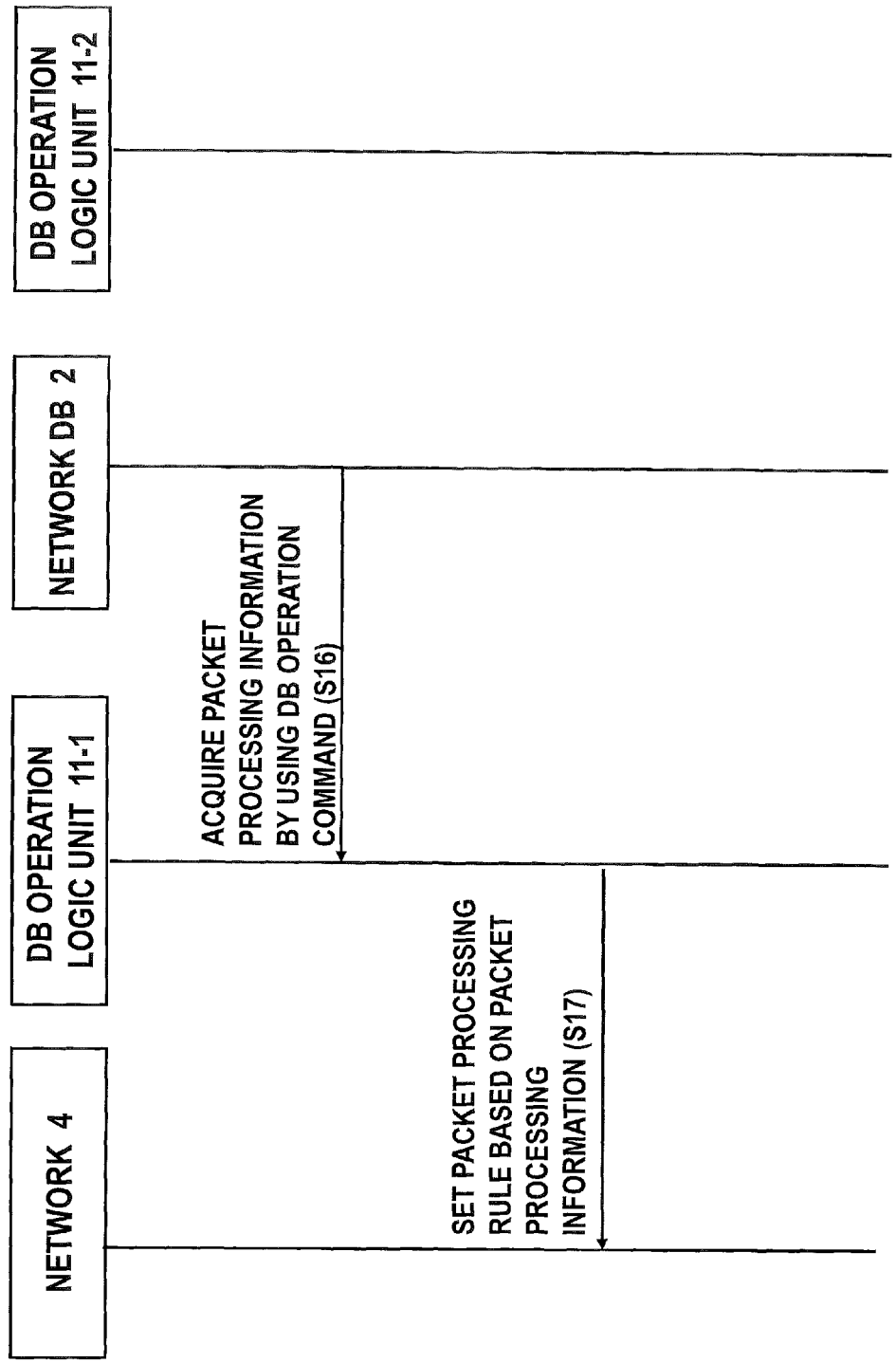
FIG. 6 is a sequence diagram illustrating an operation according to the first exemplary embodiment of the present disclosure.

FIGS. 4 to 6 illustrate operations according to the first exemplary embodiment. Since the operations in FIGS. 4 to 6 are examples, the operations according to the present disclosure are not limited to the operations illustrated in these drawings.

FIGS. 4 to 6 illustrate examples in which the network DB 2 is operated by a plurality of DB operation logic units 11 ("DB operation logic units 11-1 and 11-2"). The DB operation logic unit 11-1 has a function of operating the network DB 2 and inputting/outputting information about a topology. The DB operation logic unit 11-2 has a function of generating packet processing information based on information stored in the network DB 2.

FIG. 4 illustrates an operation in which the DB operation logic unit 11-1 manages the topology of the network 4 by operating the network DB 2.

The DB operation logic unit 11-1 of the control apparatus 1 collects information about the topology from the network 4 via the network control unit 12 (S10). The information about the topology is collected by using LLDP (Link Layer Discovery Protocol), for example. LLDP is a protocol with which apparatuses on a network exchange information with neighboring apparatuses and collect information about neighboring apparatuses connected to communication ports of the apparatuses. For example, the network control unit 12 collects information, which has been collected by each node 3 in the network 4 through LLDP, from each node 3.

For example, the DB operation logic unit 11-1 generates topology information in predetermined format corresponding to the network DB 2, based on the information collected via the network control unit 12 (S11).

By using a DB operation command (information input/output command), the DB operation logic unit 11-1 stores the generated topology information in the network DB 2 via the DB interface unit 10 (S12).

FIG. 5 illustrates an operation in which the DB operation logic unit 11-2 generates information about a method of processing packets flowing in the network 4 by operating the network DB 2.

By using a DB operation command (information input/output command), the DB operation logic unit 11-2 of the control apparatus 1 acquires the topology information from the network DB 2 via the DB interface unit 10 (S13).

The DB operation logic unit 11-2 may preset the network DB 2 by using the notification subscription command, so that, when the topology information is changed, the network DB 2 notifies the DB operation logic unit 11-2 of the change of the topology information. When the topology information is changed, the network DB 2 notifies the DB operation logic unit 11-2 of the change of the topology information via the DB interface unit 10.

Based on the topology information acquired from the network DB 2, the DB operation logic unit 11-2 generates packet processing information in predetermined format corresponding to the network DB 2 (S14). For example, the DB operation logic unit 11-2 calculates a packet forwarding path ("Path information" in FIG. 3) and stores the calculated forwarding path in the packet processing information. For example, the DB operation logic unit 11-2 calculates the forwarding path by using a predetermined calculation logic. For example, the DB operation logic unit 11-2 sets the shortest path from a source to a destination to the packet forwarding path.

In addition, the DB operation logic unit 11-2 stores a packet matching condition and processing information (rewriting of a header, for example) in the packet processing information.

By using a DB operation command (information input/output command), the DB operation logic unit 11-2 stores the generated packet processing information in the network DB 2 via the DB interface unit 10 (S15).

FIG. 6 illustrates an operation in which the control apparatus 1 controls the nodes 3 in the network 4 by operating the network DB 2.

By using a DB operation command (information input/output command), the DB operation logic unit 11-1 of the control apparatus 1 acquires the packet processing information from the network DB 2 via the DB interface unit 10 (S16).

The DB operation logic unit 11-1 may preset the network DB 2 by using the notification subscription command, so that, when packet processing information is changed, the network DB 2 notifies the DB operation logic unit 11-1 of the change of the packet processing information. For example, the DB operation logic unit 11-1 uses the notification subscription command to set a notification condition for notification of updating of the network DB 2 in the network DB 2. When updating matching such preset notification condition is executed, the network DB 2 notifies the DB operation logic unit 11-1 of the updated content of the network DB 2. For example, if the packet processing information is changed, the network DB 2 notifies the DB operation logic unit 11-1 of the change of the packet processing information via the DB interface unit 10.

Based on the packet processing information, the DB operation logic unit 11-1 generates a processing instruction to be set in a node 3 in the network 4 (information defining a packet processing method executed by a node 3) and sets the processing instruction in the node 3 via the network control unit 12 (S17).

For example, the DB operation logic unit 11-1 refers to the Path information in the packet processing information and sets a processing instruction in each node 3 on a forwarding path corresponding to the Path information. For example, the DB operation logic unit 11-1 sets a processing instruction that defines forwarding of packets from a communication port corresponding to the forwarding path in each node 3, so that packets are forwarded along the forwarding path corresponding to the Path information.

As in the above operations illustrated in FIGS. 4 to 6, by operating the network DB 2, the control apparatus 1 can control packet processing in the network 4 in a central manner.

As described above, by operating the network DB 2 with DB operation commands, the control apparatus 1 can control the network 4. Thus, an operator of the network 4 can program the control apparatus 1 by combining DB operation commands of the network DB 2. The number of DB operation commands is significantly smaller than the number of commands required for API or functions relating thereto. Thus, an operator of the network 4 can easily program the control apparatus 1, without learning advanced knowledge and skill.

<Second Exemplary Embodiment>

Next, a second exemplary embodiment of the present disclosure will be described. In the second exemplary embodiment, a configuration example of the network DB 2 and examples of the DB operation commands will be described in detail.

Figure 7:
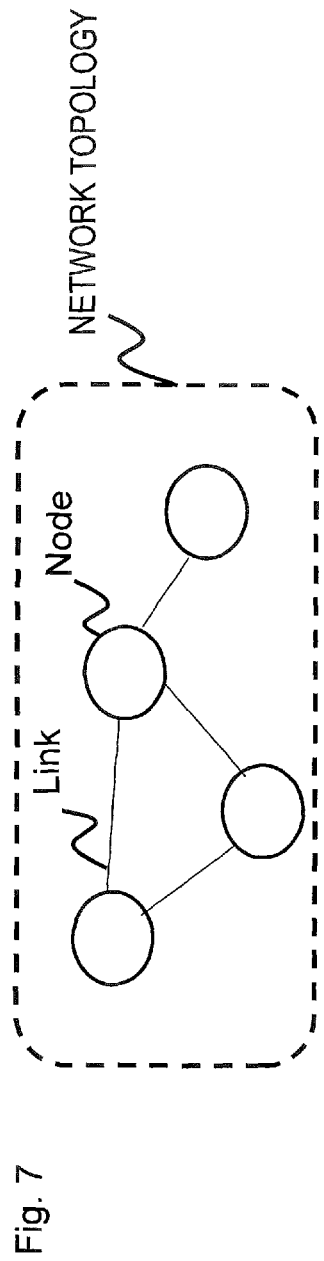
FIG. 7 illustrates a configuration of a network DB according to a second exemplary embodiment of the present disclosure.
Figure 8:
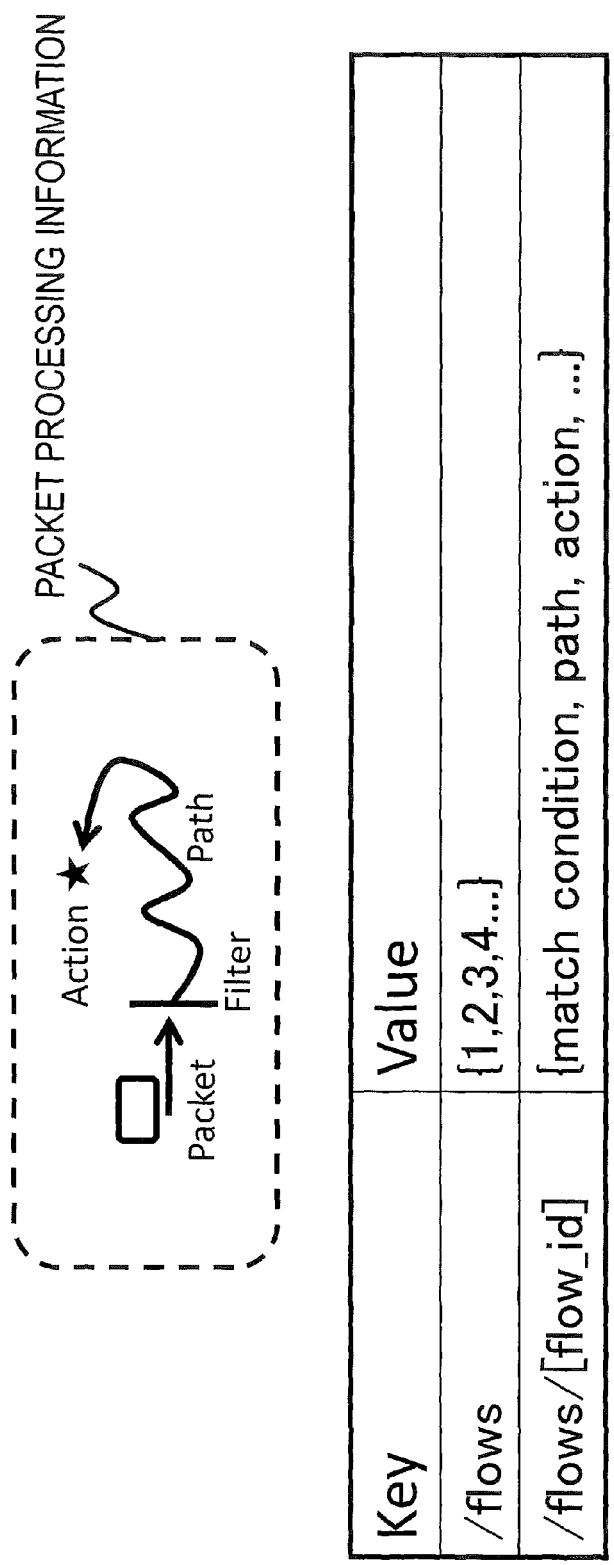
FIG. 8 illustrates a configuration of the network DB according to the second exemplary embodiment of the present disclosure.
Figure 9:
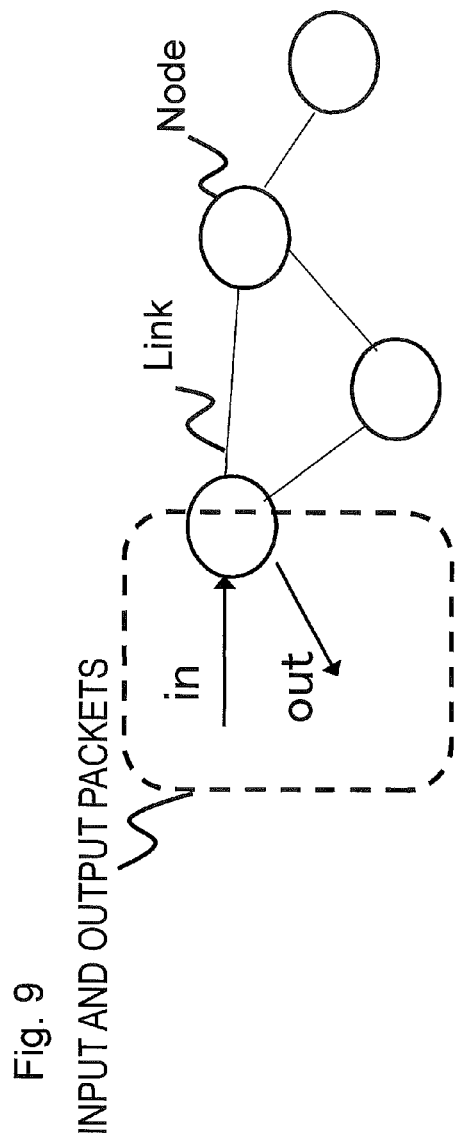
FIG. 9 illustrates a configuration of the network DB according to the second exemplary embodiment of the present disclosure.

FIGS. 7 to 9 illustrate a configuration of the network DB 2. The configuration in FIGS. 7 to 9 is an example, and therefore, the configuration of the network DB 2 is not limited thereto.

In addition, in the second exemplary embodiment, the network DB 2 is configured by Key-Value stores. However, the network DB 2 may be configured by a different way other than Key-Value stores.

FIG. 7 illustrates topology information stored in the network DB 2. The topology information is configured by identification information (Key) about the nodes 3 in the network 4 and identification information (Key) about the links among the nodes 3. Each identification information (Key) is associated with data (Value).

For example, data (Value) corresponding to identification information "/nodes" represents identifiers (node IDs) of the nodes 3 that exist in the network 4. "{1, 2, 3, 4, . . . }" in FIG. 7 represents a list of node identifiers.

"[node_id]" of identification information "/nodes/[node_id]" represents an identifier of one of the nodes 3 that exist in the network 4. For example, data (Value) corresponding to the identification information "/nodes/[node_id]" represents information about an identifier used when the control apparatus 1 controls the node 3 in the network 4 or information about the manufacturing vendor of the node 3. The identifier used when the control apparatus 1 controls the node 3 in the network 4 is different from the identifier associated with the above identification information "/nodes". In the OpenFlow protocol, an identifier used when the control apparatus 1 controls a node 3 in the network 4 is referred to as DPID (DataPath ID), for example.

For example, data (Value) corresponding to identification information "/nodes/[node_id]/ports" represents a list of identifiers of communication ports of the node 3 corresponding to "[node_id]". "{1, 2, 3, 4, . . . }" in FIG. 7 represents a list of identifiers of the communication ports.

"[port_id]" of identification information "/nodes/[node_id]/ports/[port_id]" represents an identifier indicating one of the communication ports of the node 3 corresponding to "[node_id]". For example, data (Value) of the identification information "/nodes/[node_id]/ports/[port_id]" includes a port status (for example, a link-up status or a link-down status), a communication bandwidth of the port, etc.

For example, data (Value) corresponding to identification information "/links" represents identifiers of the links among the nodes 3 that exist in the network 4. "{1, 2, 3, 4, . . . }" in FIG. 7 represents a list of link identifiers.

"[link_id]" of identification information "/links/[link_id]" represents an identifier of one of the links among the nodes that exist in the network 4. For example, data (Value) corresponding to the identification information "/links/[link_id]" includes information about nodes at both ends of the link and information about communication ports of these nodes. For example, in FIG. 7, the data (Value) includes an identifier ("src_node_id") of a packet source node in the link and an identifier ("dst_node_id") of a packet destination node in the link. In FIG. 7, "src_port_id" represents an identifier of a port corresponding to the link, among the communication ports of the node corresponding to "src_node_id". In FIG. 7, "dst_port_id" represents an identifier of a port corresponding to the link, among the communication ports of the node corresponding to "dst_node_id".

The network DB 2 manages the topology of the network 4 by using these database entries illustrated in FIG. 7. By using DB operation commands and operating the entries illustrated in the FIG. 7, the DB operation logic unit 11 can manage and operate the topology of the network 4.

FIG. 8 illustrates packet processing information stored in the network DB 2. For example, the packet processing information includes: a matching condition (Filter) for identifying packets corresponding to the packet processing information; a forwarding path (Path) for packets matching the matching condition; and a predetermined process (Action) to be applied to the packets matching the matching condition.

Data (Value) corresponding to identification information ("/flows") represents identifiers of the packet processing information. "{1, 2, 3, 4, . . . }" in FIG. 8 represents a list of identifiers of the packet processing information.

"[flow_id]" of identification information ("/flows/[flow_id]") represents an identifier of one of the packet processing information. For example, data (Value) of the identification information "/flows/[flow_id]" includes a matching condition for identifying packets corresponding to the packet processing information corresponding to "[flow_id]". For example, when receiving a packet for which a processing method is unknown, the DB operation logic unit 11 of the control apparatus 1 uses a DB operation command to search the network DB 2 for packet processing information having a matching condition corresponding to the packet. The network DB 2 refers to information about the packet (for example, header information) and notifies the DB operation logic unit 11 of packet processing information having a matching condition corresponding to the packet. Based on the supplied packet processing information, the DB operation logic unit 11 instructs the node 3 in the network 4 to process the packet.

There are cases where the network DB 2 does not have a DB operation command for referring to information about the packet (for example, header information) and searching for packet processing information having a matching condition corresponding to the packet. In such cases, the DB operation logic unit 11 of the control apparatus 1 may use a DB operation command to read necessary packet processing information from the network DB 2 and store the information in advance. In this way, the DB operation logic unit 11 can determine corresponding packet processing information by simply referring to information about the packet. Based on the determined packet processing information, the DB operation logic unit 11 gives an instruction about packet processing to the node 3 in the network 4.

Data (Value) corresponding to the identification information "/flows/[flow_id]" includes a forwarding path ("Path") for packets matching the matching condition and a process ("Action") to be executed on the packets matching the matching condition. The DB operation logic unit 11 notifies nodes 3 in the network 4 of an instruction for forwarding the packet, so that the packet is forwarded along the forwarding path defined in the packet processing information. In addition, if a process ("Action") to be executed on a packet exists, the DB operation logic unit 11 instructs the nodes 3 in the network 4 to execute the process.

FIG. 9 illustrates database entries about packets forwarded to the control apparatus 1 as packets for which a processing method is undetermined. The network DB 2 can manage information about packets for which a processing method is undetermined as database entries.

Data (Value) corresponding to identification information "/packets/in" represents a list of identifiers of packets forwarded to the control apparatus 1 as packets for which a packet processing method is undetermined. For example, the identifier list is used as a queue of FIFO (First In First Out), by using a DB operation command "push_tail" for adding a value to the end of the list and a DB operation command "pop_head" for extracting a value from the top of the list.

For example, data (Value) of identification information "/packets/in/[packet_id]" includes an identifier of a packet, the reception time of the packet, an identifier of a node 3 that has received the packet, and an identifier of a communication port of the packet reception node 3.

For example, if a packet is forwarded to the control apparatus 1, the DB operation logic unit 11 uses a DB operation command to store information about the packet in the network DB 2.

Data (Value) corresponding to identification information "/packets/out" represents a list of identifiers of packets, for which a processing method has been determined and which need to be returned to the network 4 from the control apparatus 1. For example, among the packets stored in the queue corresponding to "/packets/in", packets for which a processing method has been determined are stored in the queue corresponding to "/packets/out". For example, data (Value) corresponding to "/packets/out" is a list and is used as a FIFO-type queue.

For example, data (Value) corresponding to identification information "/packets/out/[packet_id]" includes an identifier of a node to which a packet is returned from the control apparatus 1, an identifier of a port to which the packet is returned among the communication ports of the node, and data stored in the packet (namely, the packet itself).

For example, the DB operation logic unit 11 uses the notification subscription command to operate the network DB 2, so that, if a packet is stored in the queue corresponding to "/packets/out" and if the key "/packets/out" is operated, the DB operation logic unit 11 is notified. If a packet is stored in a queue (namely, if an entry corresponding to "/packets/out" and "/packets/out/[packet_id]" is updated), the network DB 2 notifies the DB operation logic unit 11 of updating of the data corresponding to "/packets/out/[packet_id]".

A packet stored in the identification information "/packets/out/" and "/packets/out/[packet_id]" may not correspond to a packet stored in the queue corresponding to "/packets/in". In this way, the control apparatus 1 can actively output packets.

FIGS. 10 and 11 illustrate DB operation commands used when the DB operation logic unit 11 operates the network DB 2. As illustrated in FIGS. 10 and 11, by using push commands and pop commands, operations such as data insertion and acquisition from an arbitrary position of the list can be executed. In addition, for example, the control apparatus 1 uses a subscribe command to be notified of change of an entry having a certain key in the database. In addition, for example, commands such as get, put, and delete are used to acquire, set, and delete detailed information about or a value of the node, link, flow, and packet.

By using these DB operation commands illustrated in FIGS. 10 and 11 and operating the network DB 2 configured as illustrated in FIGS. 7 to 9, the DB operation logic unit 11 can control the network 4 in a central manner. Thus, by using the DB operation commands and combining operation instructions for the network DB 2, an operator can program the control apparatus 1. The number of DB operation commands is greatly smaller than the number of commands required for API or functions relating thereto used in general programming. Thus, an operator can program the control apparatus 1 very easily, as compared with general programming.

<Third Exemplary Embodiment>

Next, a third exemplary embodiment of the present disclosure will be described. The DB operation logic unit 11 can be implemented by a module having various functions. In the third exemplary embodiment, an OpenFlow control unit 11A is arranged as the DB operation logic unit 11.

Figure 12:
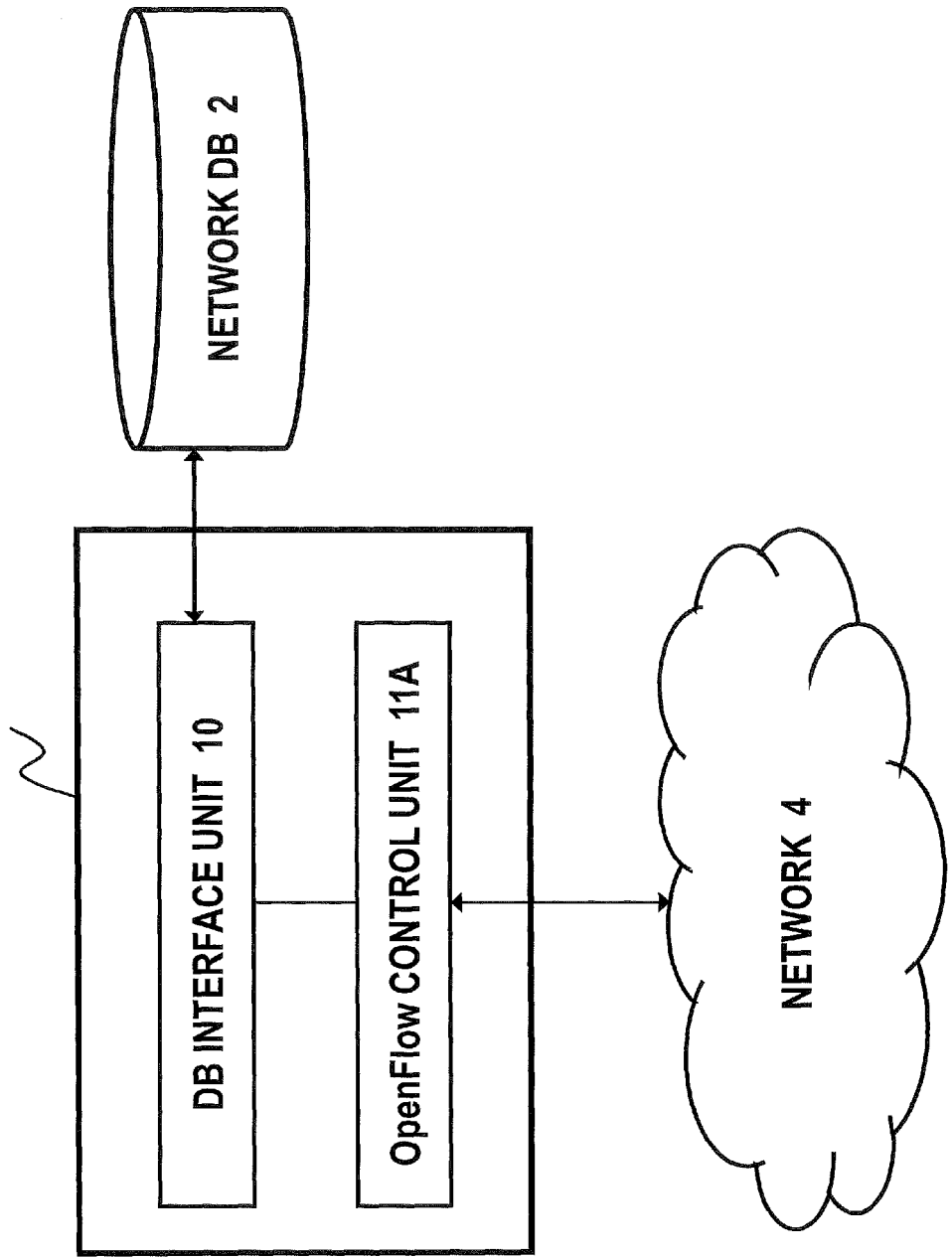
FIG. 12 illustrates a configuration of a system according to a third exemplary embodiment of the present disclosure.

FIG. 12 illustrates a configuration of a system according to the third exemplary embodiment. The OpenFlow control unit 11A has a function of controlling the network 4 based on the OpenFlow protocol. The third exemplary embodiment will be described assuming that the network 4 is configured by nodes 3 compatible with the OpenFlow protocol. In the third exemplary embodiment, as needed, the network 4 will be referred to as an OpenFlow network.

Figure 13:
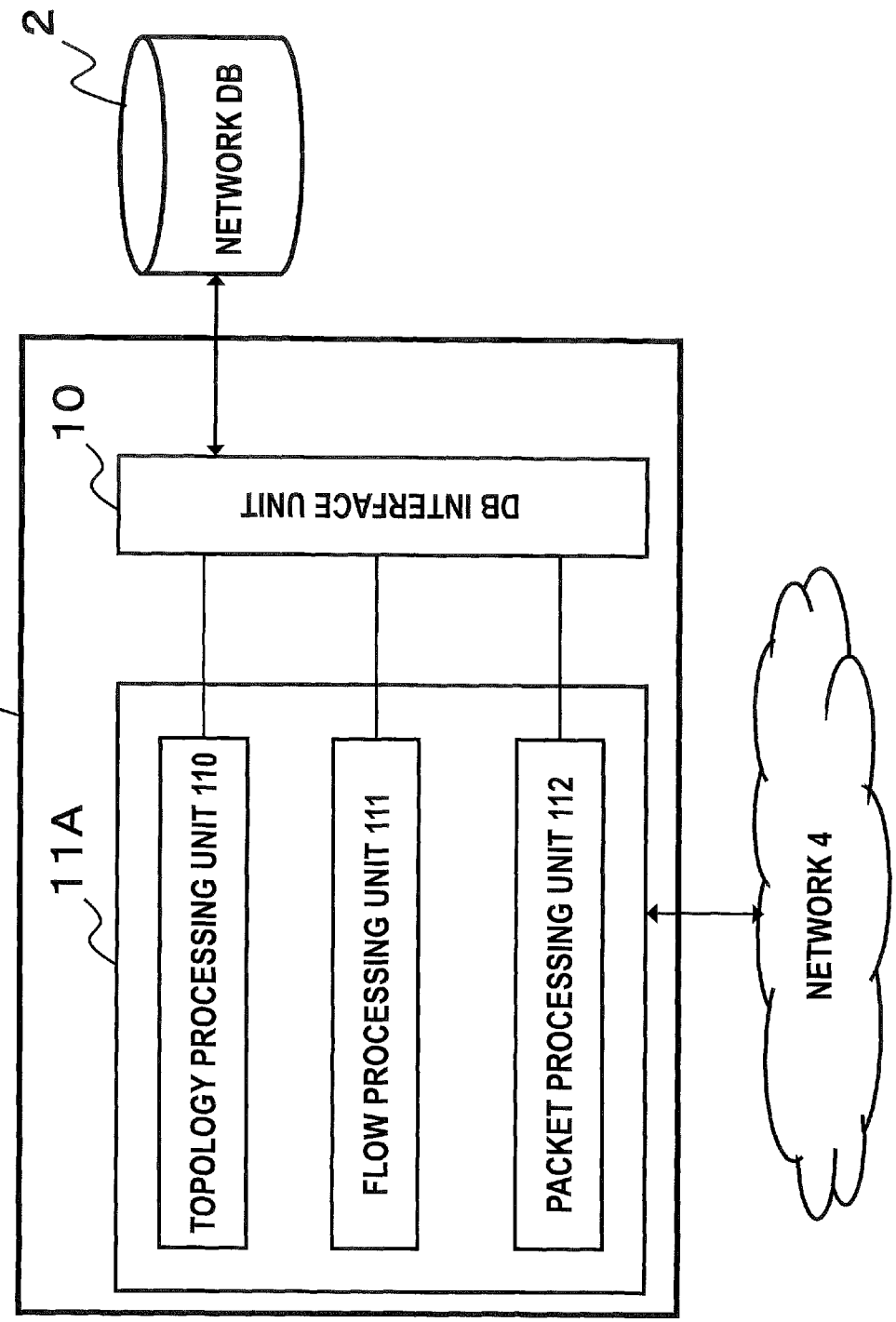
FIG. 13 illustrates a configuration of an OpenFlow control unit according to the third exemplary embodiment of the present disclosure.

FIG. 13 illustrates a configuration of the OpenFlow control unit 11A. The OpenFlow control unit 11A includes a topology processing unit 110, a flow processing unit 111, and a packet processing unit 112.

The topology processing unit 110 uses a DB operation command to operate the network DB 2 via the DB interface unit 10. For example, the topology processing unit 110 operates the network DB 2 to set topology information in the network DB 2. In addition, for example, the topology processing unit 110 operates the network DB 2 to acquire topology information from the network DB 2.

Figure 14:
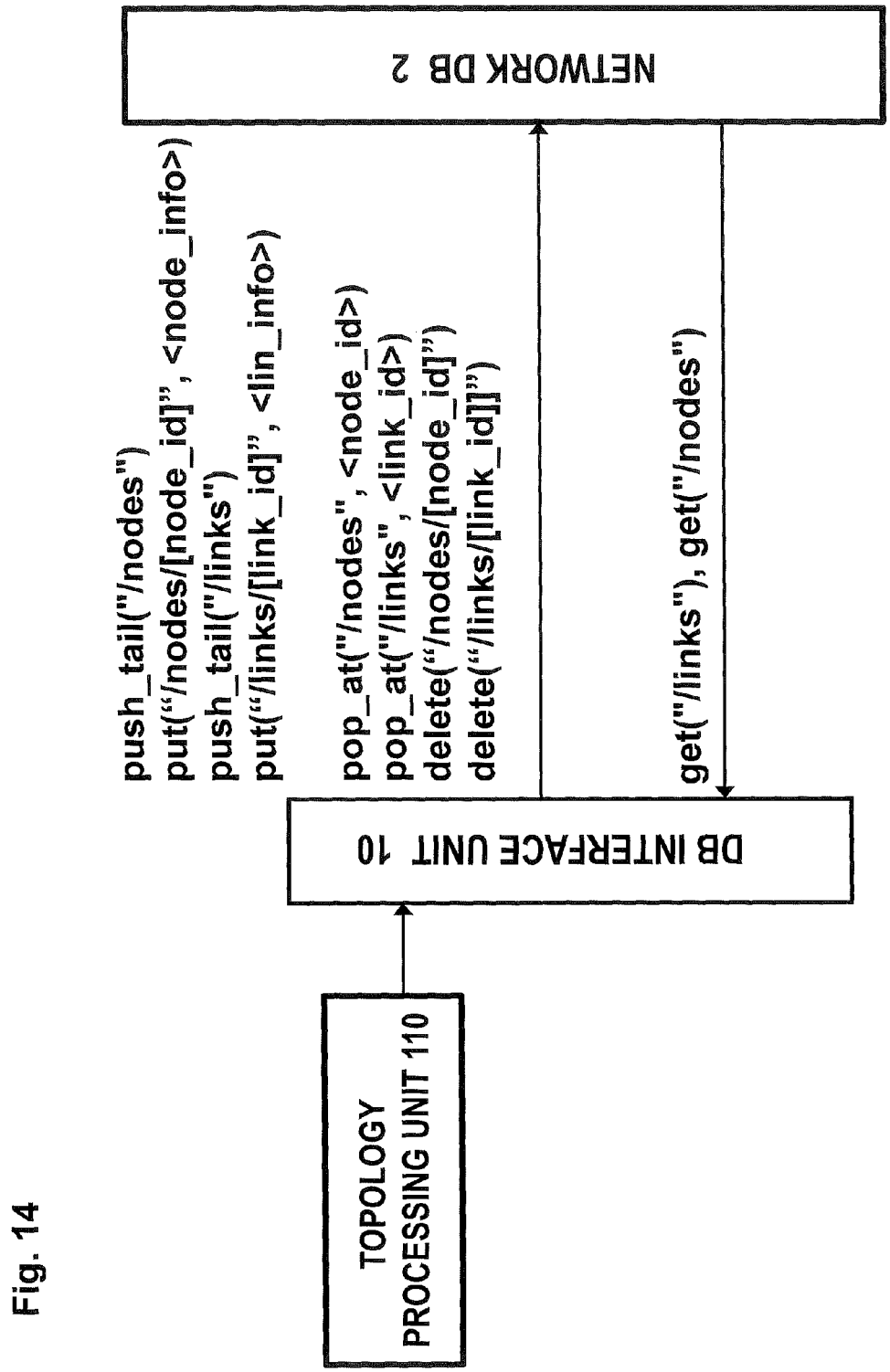
FIG. 14 illustrates an operation flow of a network DB by a topology processing unit according to the third exemplary embodiment of the present disclosure.

FIG. 14 illustrates an operation example in which the topology processing unit 110 operates the network DB 2. The topology processing unit 110 uses a command "push_tail(/nodes)" to add an identifier of a node added to the OpenFlow network to the end of the entry list "/nodes". In addition, the topology processing unit 110 uses a command "put(/nodes/[node_id], <node_info>)" to add information corresponding to "<node_info>", which is an argument of the command, to the entry "/nodes/[node_id]" ([node_id] is an identifier of the node added to the entry "/nodes"). For example, the topology processing unit 110 adds information described in the first exemplary embodiment to the entry "/nodes/[node_id]".

By using a command "push_tail(/nodes, <node_info>)" instead of the above command "push_tail(/nodes)", the above series of operations can be executed collectively. In such case, execution of the command "put(/nodes/[node_id], <node_info>)" can be omitted.

The topology processing unit 110 uses a command "push_tail(/links)" to add an identifier of an inter-node link added to the OpenFlow network to the end of the entry list "/links". In addition, the topology processing unit 110 uses a command "put(/links/[link_id], <link_info>)" to add information corresponding to "<link_info>", which is an argument of the command, to the entry "/links/[link_id]" ([link_id] is an identifier of the link added to the entry "/links"). For example, the topology processing unit 110 adds information described in the first exemplary embodiment to the entry "/links/[link_id]".

By using a command "push_tail(/links, <link_info>)" instead of the above command "push_tail(/links)", the above series of operations can be executed collectively. In such case, execution of the command "put(/links/[link_id], <link_info>)" can be omitted.

If a node or a link is deleted from the OpenFlow network, the topology processing unit 110 uses a command "pop_at" to delete an identifier of the deleted node or link from the node or link list. If a node or a link is deleted from the OpenFlow network, the topology processing unit 110 uses a command "delete" to delete an entry corresponding to the deleted node or link from the network DB 2.

By using the command "pop_at", the above series of operations can be executed collectively. Thus, execution of the command "delete" can be omitted.

By using a command "get", the topology processing unit 110 acquires data (value) corresponding to specified identification information (key).

The flow processing unit 111 uses a DB operation command to operate the network DB 2 via the DB interface unit 10. For example, the flow processing unit 111 operates the network DB 2 to set packet processing information in the network DB 2. In addition, for example, the flow processing unit 111 operates the network DB 2 to search the network DB 2 for packet processing information corresponding to a packet for which a processing method is unknown.

Figure 15:
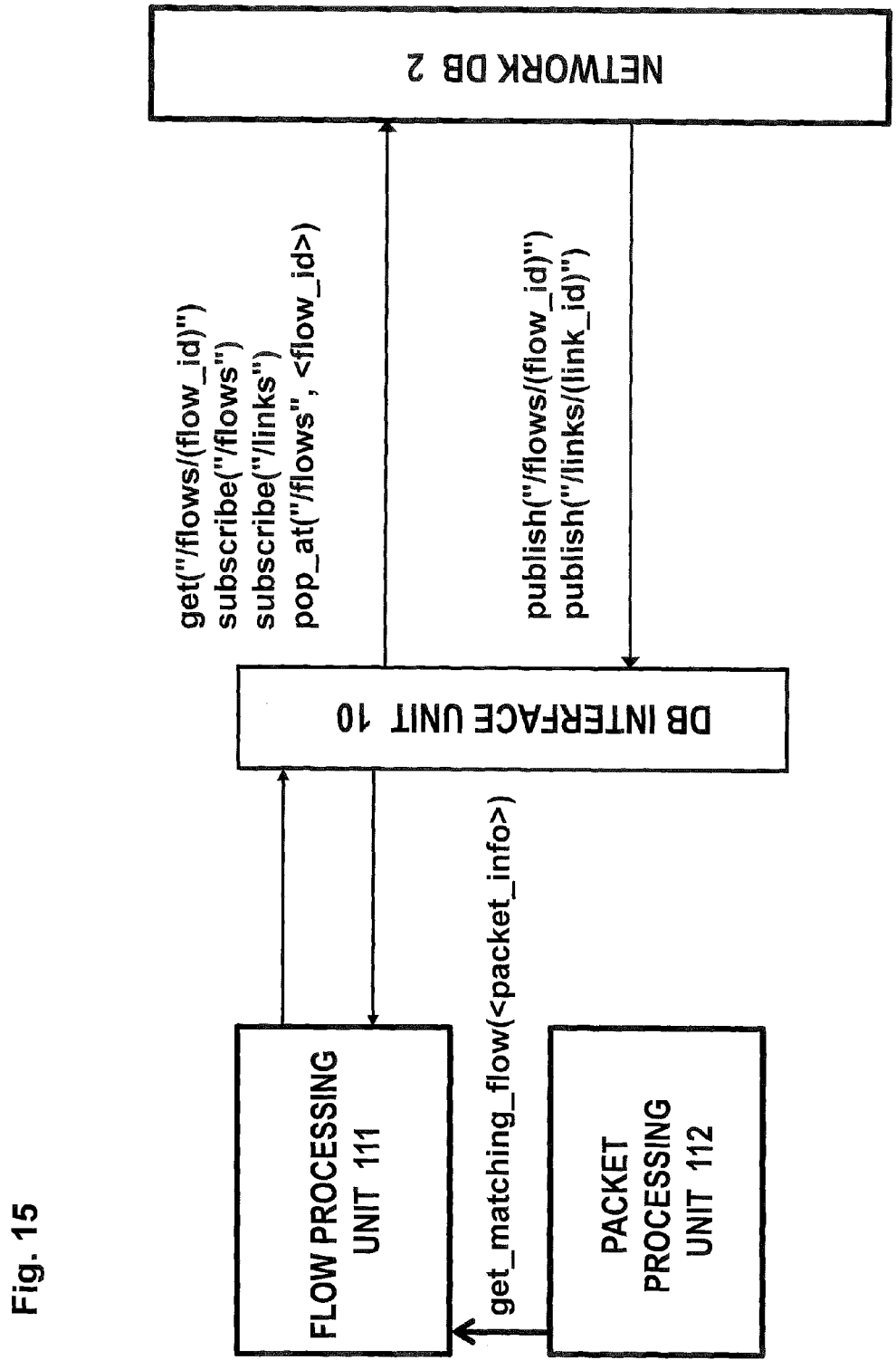
FIG. 15 illustrates an operation flow of the network DB by a flow processing unit according to the third exemplary embodiment of the present disclosure.

FIG. 15 illustrates an operation example in which the flow processing unit 111 operates the network DB 2. If the control apparatus 1 receives a packet for which a processing method is unknown from the OpenFlow network, the flow processing unit 111 receives a request for searching for a processing method for the packet from the packet processing unit 112. For example, the packet processing unit 112 uses a command "get_matching_flow(<packet_info>)" to request the flow processing unit 111 to search for a processing method for the packet. "<packet_info>", which is an argument of the command, is information about the packet for which a processing method is unknown (for example, header information or the packet itself).

Based on the request from the packet processing unit 112, the flow processing unit 111 searches the network DB 2 for packet processing information having a matching condition corresponding to "<packet_info>". The flow processing unit 111 receives the identifier ("flow_id") of the retrieved packet processing information from the network DB 2. For example, based on the received identifier and by using a command "get(/flows/[flow_id])", the flow processing unit 111 acquires the packet processing information. The flow processing unit 111 supplies the packet processing information to the packet processing unit 112. If such packet processing information matching the search condition does not exist, the flow processing unit 111 notifies to that effect to the packet processing unit 112.

If the network DB 2 does not have a command for searching for packet processing information having a matching condition corresponding to "<packet_info>", the flow processing unit 111 may use a DB operation command to read necessary packet processing information from the network DB 2 and store the information in advance. In this way, the flow processing unit 111 can determine corresponding packet processing information by referring to information about the packet.

If no corresponding packet processing information exists, the packet processing unit 112 uses a command "push_tail(/packets/in, <packet_info>)" to add the received packet to the network DB 2.

If a corresponding packet processing information exists, the packet processing unit 112 requests the flow processing unit 111 to process the packet.

Based on the acquired packet processing information, the flow processing unit 111 sets a packet handling operation (i.e., packet processing rule) in a node 3 in the OpenFlow network and simultaneously causes the node 3 to output the received packet from an appropriate node communication port of the node 3 based on the packet processing information.

For example, a packet handling operation is information in format defined based on the OpenFlow protocol and is used for causing a node 3 to process a packet. A packet handling operation includes an identification condition for identifying a packet received by a node 3 and a method for processing a packet matching the identification condition. The flow processing unit 111 sets a packet handling operation in a node 3 and the node 3 stores the set packet handling operation in a memory. The node 3 searches the memory for a packet handling operation having an identification condition matching the received packet. If the node 3 finds a packet handling operation having an identification condition matching the received packet, based on the retrieved packet handling operation, the node 3 processes the received packet (forwards the packet through a communication port specified by the packet handling operation, for example).

For example, the flow processing unit 111 sets the identification condition in the packet handling operation, based on the matching condition included in the packet processing information.

Based on path information (Path) included in the packet processing information, the flow processing unit 111 recognizes a packet forwarding path in the OpenFlow network. The flow processing unit 111 notifies nodes 3 on the packet forwarding path of the packet handling operation. Based on the packet handling operation, the flow processing unit 111 can instruct each node 3 on the forwarding path to forward a packet along the forwarding path corresponding to the packet processing information. Namely, when the flow processing unit 111 instructs the nodes 3 to forward a packet, the packet handling operation set in each node 3 includes a processing method for forwarding a packet through a communication port corresponding to the forwarding path.

If the packet processing information includes a predetermined process (Action) that needs to be executed on the packet, for example, the flow processing unit 111 determines a node 3 that needs to execute the predetermined process (Action). The flow processing unit 111 sets a packet handling operation, in which a process determined as a predetermined process (for example, header rewriting or encapsulation/decapsulation) is defined, in the determined node 3.

For example, the flow processing unit 111 uses the command "subscribe", so that, when predetermined updating is executed in the network DB 2 (updating of packet processing information or link information), the network DB 2 notifies the flow processing unit 111 of information about the updating. If information specified by the command "subscribe" is updated, the network DB 2 uses the command "publish" to notify the flow processing unit 111 of the information. For example, based on the information supplied by using the command "publish," the flow processing unit 111 determines whether to change a packet handling operation already set in a node 3 in the OpenFlow network. If change of a packet handling operation is necessary, the flow processing unit 111 generates and sets a new packet handling operation in the node 3.

If a link or a node in the OpenFlow network is deleted, for example, the flow processing unit 111 deletes packet processing information corresponding to the deleted link or node from the network DB 2. For example, the flow processing unit 111 deletes packet processing information including the forwarding path on which the deleted link or node is arranged from the network DB 2.

The flow processing unit 111 uses the command "pop_at" to delete an identifier corresponding to packet processing information that needs to be deleted from the list of packet processing information. The flow processing unit 111 uses the command "delete" to delete an entry ("/flows/[flow_id]") corresponding to the packet processing information. For example, the flow processing unit 111 generates new packet processing information that replaces the deleted packet processing information, uses a command "push_at", and stores the generated packet processing information in the network DB 2.

By using the command "pop_at", the above series of operations can be executed collectively. Thus, execution of the command "delete" can be omitted.

The packet processing unit 112 uses a DB operation command to operate the network DB 2 via the DB interface unit 10. For example, the packet processing unit 112 operates the network DB 2 to set information about a packet in the network DB 2.

Figure 16:
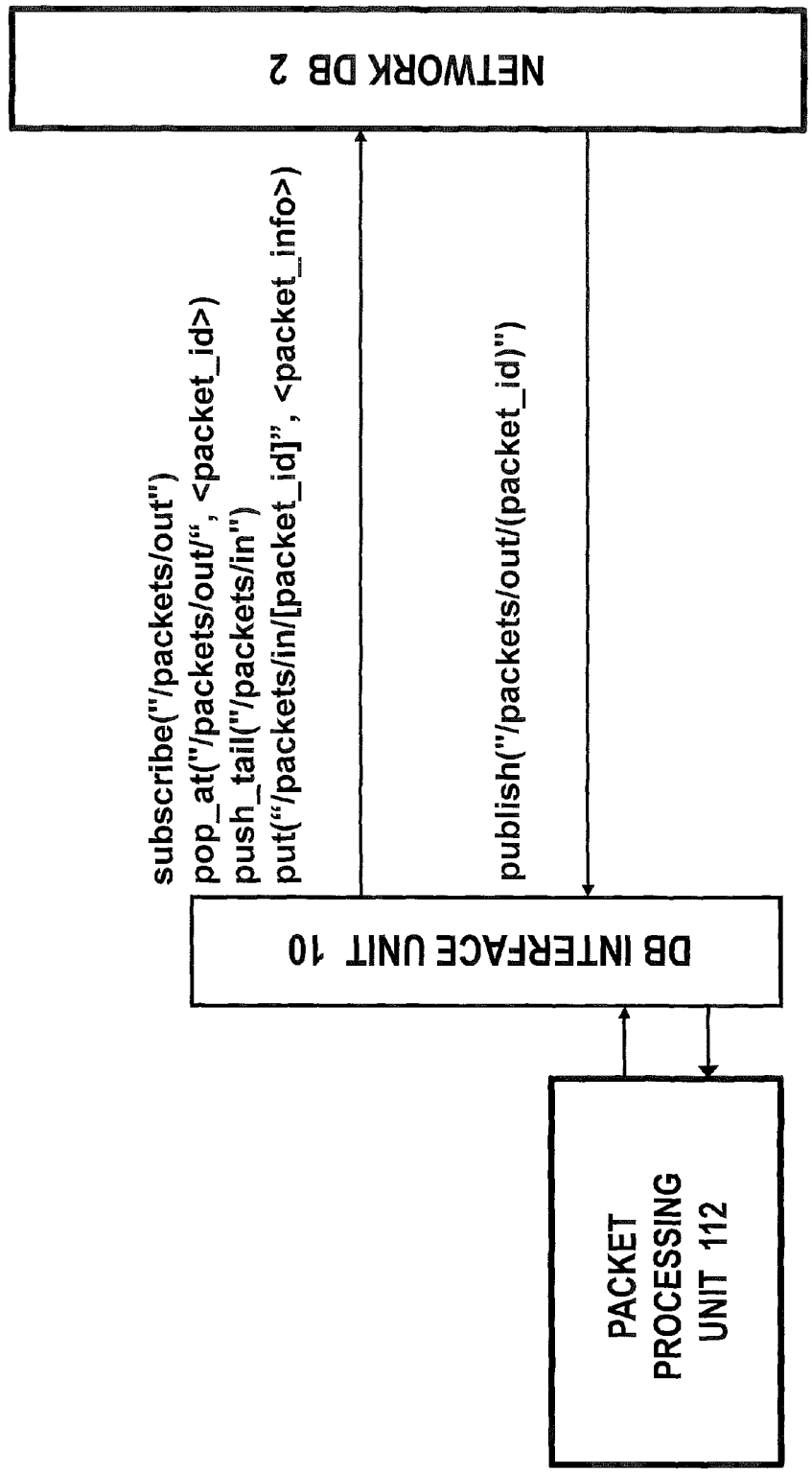
FIG. 16 illustrates an operation flow of the network DB by a packet processing unit according to the third exemplary embodiment of the present disclosure.

FIG. 16 illustrates an operation example in which the packet processing unit 112 operates the network DB 2. For example, when receiving a packet for which a processing method is unknown from the OpenFlow network, the packet processing unit 112 requests the flow processing unit 111 for a processing method corresponding to the packet. As described above, for example, the packet processing unit 112 uses the command "get_matching_flow(<packet_info>)" to request the flow processing unit 111 to search for a packet processing method.

If the packet processing unit 112 is notified by the flow processing unit 111 that packet processing information corresponding to the packet does not exist, the packet processing unit 112 registers information about the packet in the network DB 2. For example, the packet processing unit 112 uses the command "push_tail(/packets/in)" to register an identifier of the packet in the end of the entry list "/packets/in". In addition, the packet processing unit 112 uses a command "put(/packets/in/[packet_id], <packet_info>)" to add information corresponding to "<packet_info>", which is an argument of the command, to the entry "/packets/in/[packet_id]" ([packet_id] is an identifier of the packet added to the entry/packets/in).

By using a command "push_tail(/packets/in, <node_info>)" instead of the above command "push_tail(/packets/in)", the above series of operations can be executed collectively. In such case, execution of the command "put(/packets/in/[node_id], <packet_info>)" can be omitted.

If packet processing information corresponding to the packet added to the entry "/packets/in" is generated, the packet is added to the entry "/packets/out". For example, the packet processing unit 112 sets the network DB 2 in advance, so that, if the command "subscribe" is used and if a packet is added to the entry "/packets/out", the network DB 2 notifies the packet processing unit 112 of information about updating of the entry "/packets/out". For example, the packet processing unit 112 uses the command "publish", so that, if the entry "/packets/out" is updated, the packet processing unit 112 receives a changed key from the network DB 2. In this way, the packet processing unit 112 can recognize an identifier of the packet that has been registered in the entry "/packets/out". For example, if the flow processing unit 111 sets a packet handling operation in a node in the OpenFlow network, the packet processing unit 112 transmits a packet corresponding to the received identifier to the OpenFlow network. In addition, the packet processing unit 112 uses a command "pop_at(/packets/out, <packet_id>)" to delete the received identifier from the entry "/packets/out" and uses the command "delete" to delete the entry "/packets/out/[packet_id]".

If a command "pop_head(/packets/out)" is used instead of the above command "pop_at", packet information can be received from the top of "/packets_out" and the entry "/packets/out/[packet_id]" can be deleted. Thus, execution of the above command "delete" can be omitted.

FIGS. 17 to 20 are sequence diagrams illustrating operations according to the third exemplary embodiment.

Figure 17:
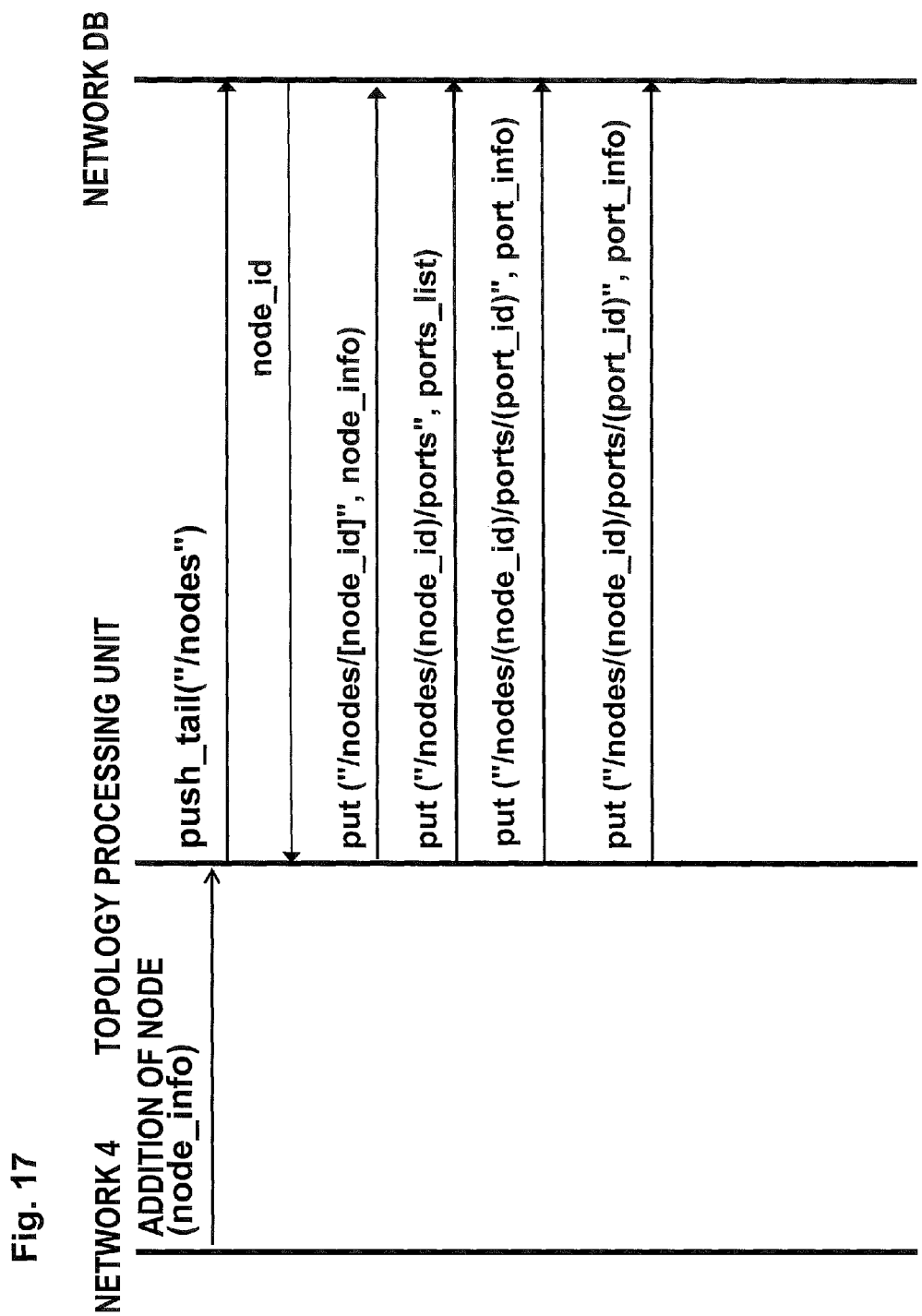
FIG. 17 is a sequence diagram illustrating an operation according to the third exemplary embodiment of the present disclosure.

FIG. 17 illustrates an operation executed when a node is added to the network 4. The topology processing unit 110 detects addition of a node to the OpenFlow network and collects information about the added node.

For example, the topology processing unit 110 uses the command "push_tail(/nodes)" to add the node to the entry list "/nodes" in the network DB 2. After adding the node to the list, the topology processing unit 110 receives "node_id" which is an identifier of the node in the network DB 2 from the network DB 2. For example, the topology processing unit 110 uses the command "put" to add information about the node to entries in the network DB 2. For example, the information about the node added is information about the node and information about a communication port of the node.

Figure 18:
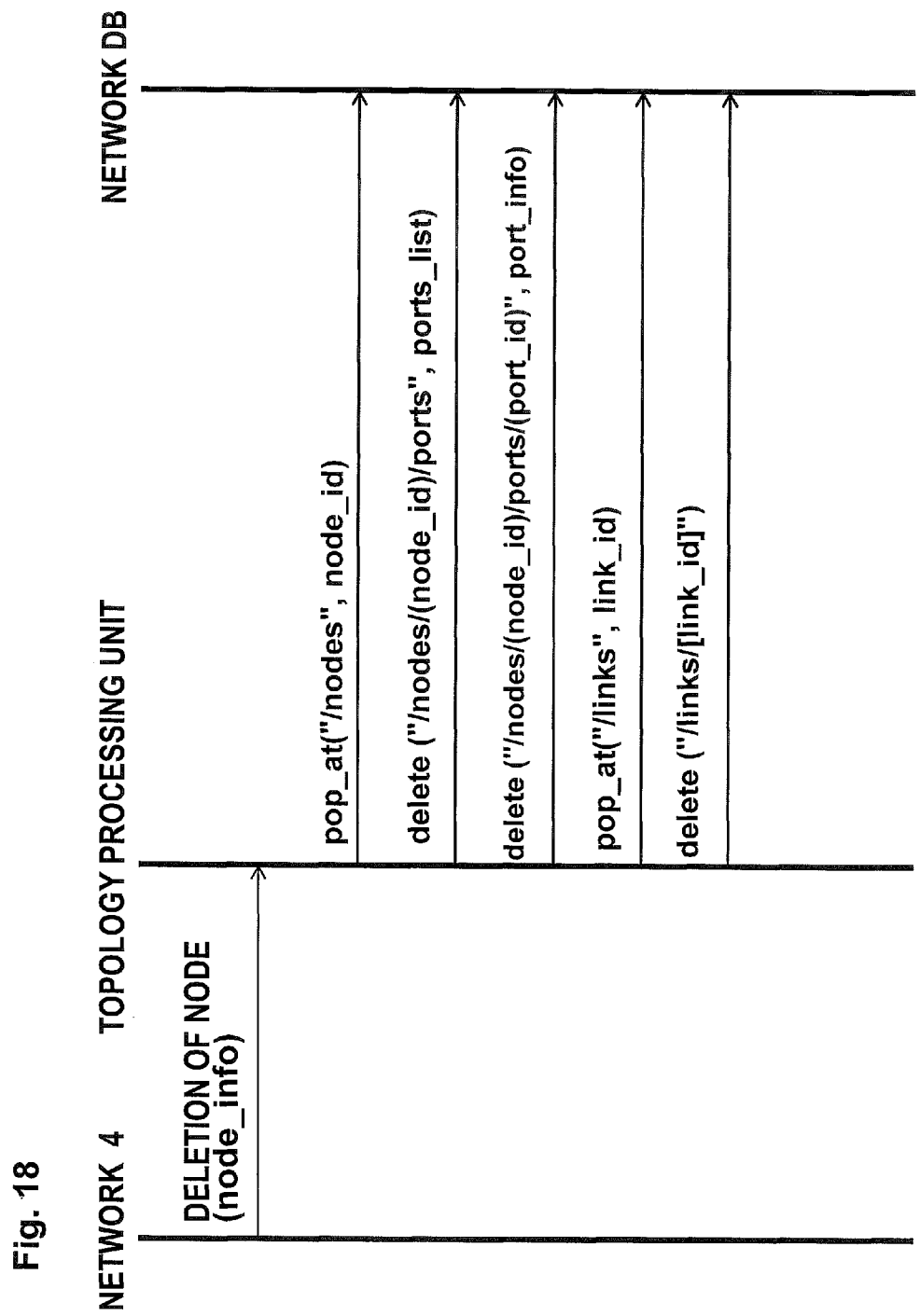
FIG. 18 is a sequence diagram illustrating an operation according to the third exemplary embodiment of the present disclosure.

FIG. 18 illustrates an operation executed when a node is deleted from the network 4. The topology processing unit 110 detects deletion of a node from the OpenFlow network and collects information about the deleted node.

For example, the topology processing unit 110 uses the command "pop_at" to delete an identifier corresponding to the deleted node from the entry list "/nodes". In addition, the topology processing unit 110 uses the command "pop_at" to delete an identifier of the link relating to the deleted node from the entry list "/links".

For example, the topology processing unit 110 uses the command "delete" to delete information about the node deleted from the OpenFlow network and information about the link relating to the deleted node.

Figure 19:
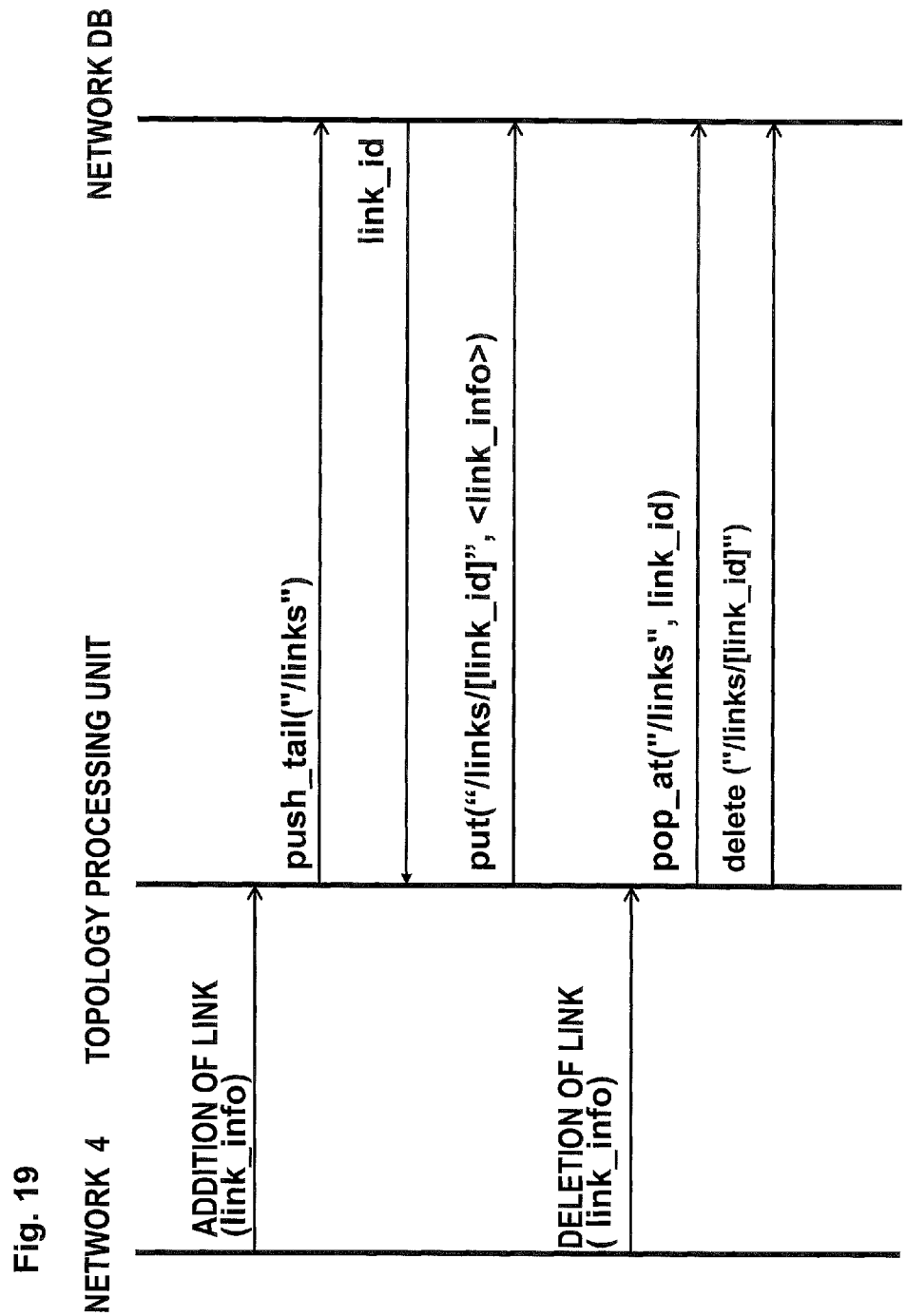
FIG. 19 is a sequence diagram illustrating an operation according to the third exemplary embodiment of the present disclosure.

FIG. 19 illustrates an operation executed when a link is added to the network 4 and an operation executed when a link is deleted from the network 4. The topology processing unit 110 detects addition of a link to the OpenFlow network and collects information about the added link.

For example, the topology processing unit 110 uses the command "push_tail" to add the link to the entry "/links". After adding the link to the entry list "/links", the topology processing unit 110 receives an identifier of the link added to the list from the network DB 2. Based on the received identifier, the topology processing unit 110 uses the command "put" to register information about link added to the OpenFlow network to the entry "/links/[link_id]".

The topology processing unit 110 detects deletion of the link from the OpenFlow network and collects information about the deleted link. For example, the topology processing unit 110 uses the command "delete" to delete the entry "/links/[link_id]" of the deleted link from the network DB 2. In addition, for example, the topology processing unit 110 uses the command "pop_at" to delete an identifier of the link deleted from the entry list "/links".

Figure 20:
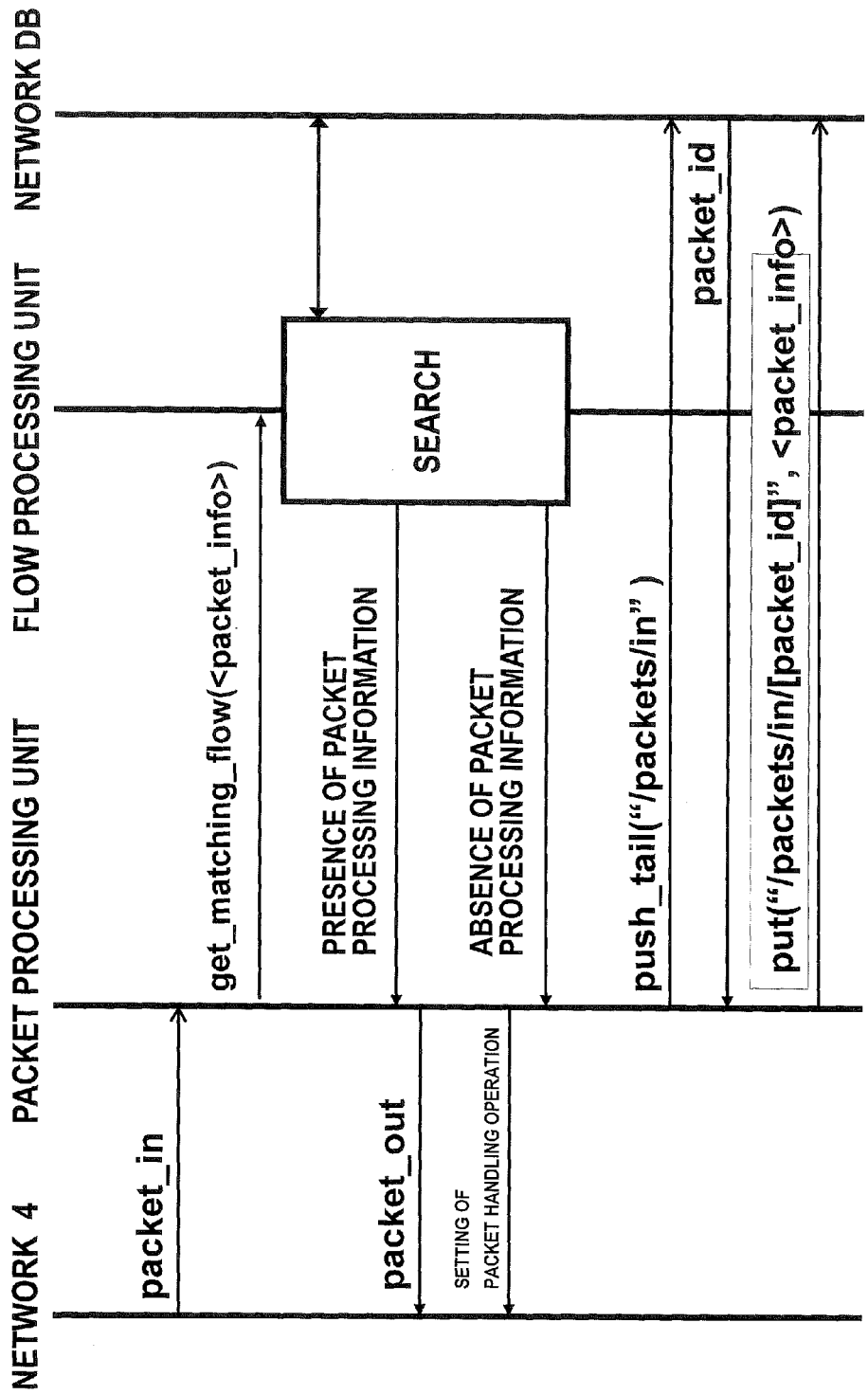
FIG. 20 is a sequence diagram illustrating an operation according to the third exemplary embodiment of the present disclosure.

FIG. 20 is a sequence diagram illustrating an operation in which the OpenFlow control unit 11A controls the OpenFlow network based on packet processing information included in the network DB 2. The packet processing unit 112 receives a packet for which a packet processing method is unknown from the OpenFlow network ("packet_in" in FIG. 20). For example, the packet processing unit 112 uses the command "get_matching_flow(<packet_info>)" to query the flow processing unit 111 about packet processing information corresponding to the received packet.

For example, the flow processing unit 111 searches the network DB 2 for the entry ("/flows/[flow_id]") having a matching condition matching the packet information ("packet_info") included in "get_matching_flow(<packet_info>)".

If the flow processing unit 111 finds packet processing information matching the packet received by the packet processing unit 112, for example, the flow processing unit 111 generates a packet handling operation (processing rule) to be set in a node 3 in the network 4 and notifies the node 3 of the packet handling operation via the packet processing unit 112. In addition to notifying the node 3 of the packet handling operation, the packet processing unit 112 returns the packet received from the network 4 to the network 4 ("packet_out" in FIG. 20).

If the flow processing unit 111 does not find packet processing information matching the packet received by the packet processing unit 112, the flow processing unit 111 uses the command "push_tail" to add the packet received by the packet processing unit 112 to the entry "/packets/in". After adding the packet to the entry "/packets/in", the flow processing unit 111 receives an identifier of the packet added to the entry from the network DB 2 ("packet_id" in FIG. 20). Based on the received identifier, the flow processing unit 111 uses the command "put" to add information about the packet received by the packet processing unit 112 to the entry "/packets/in/[packet_id]".

<Fourth Exemplary Embodiment>

Next, a fourth exemplary embodiment of the present disclosure will be described. In the fourth exemplary embodiment, an example in which the control apparatus 1 operates the network DB 2 by using a visualization DB operation logic unit 11B will be described.

To support an operator managing the network 4 with the control apparatus 1, the visualization DB operation logic unit 11B has a function of graphically displaying at least part of the information stored in the network DB 2 so that the information can be grasped visually.

Figure 21:
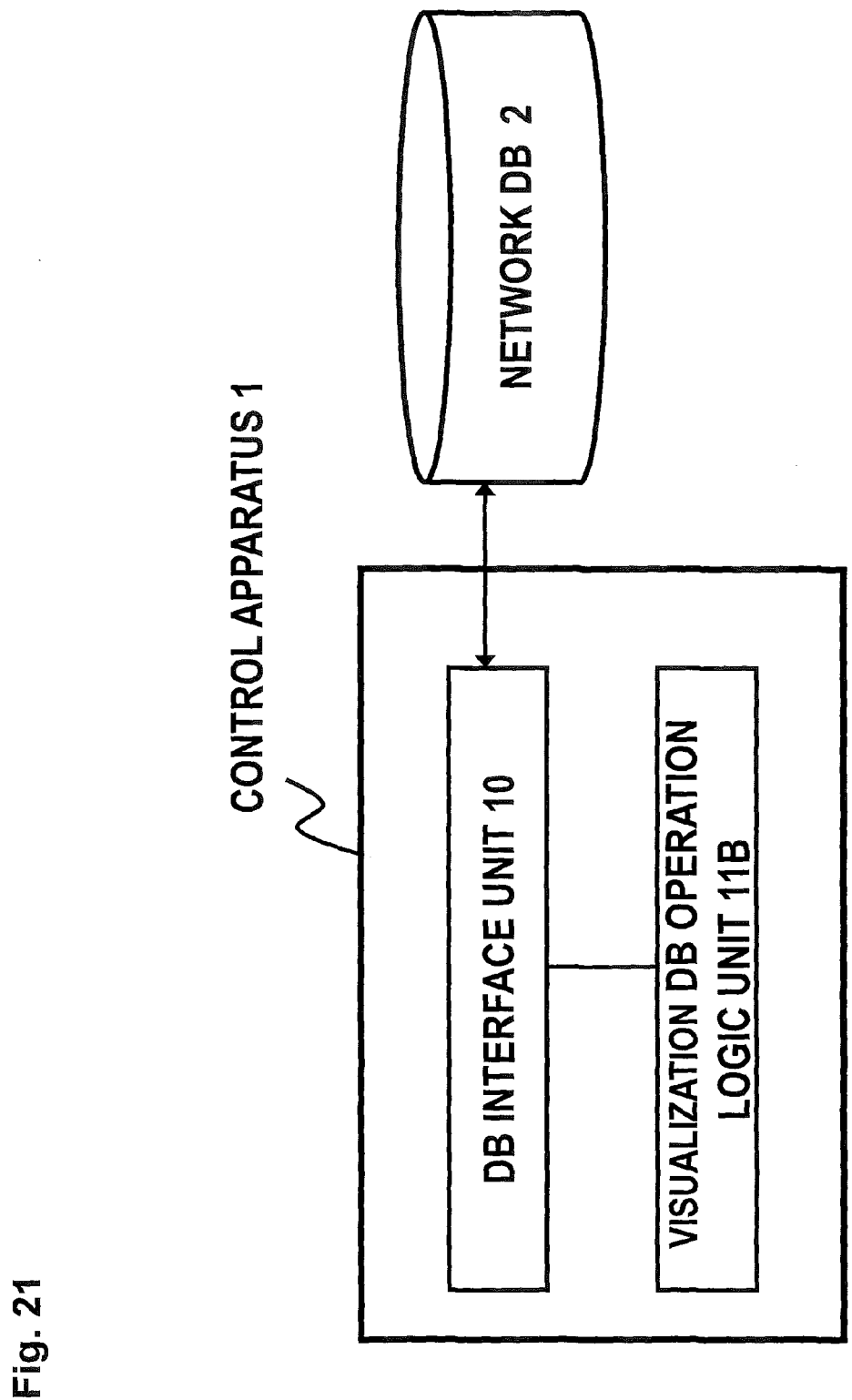
FIG. 21 illustrates a configuration of a system according to a fourth exemplary embodiment of the present disclosure.
Figure 22:
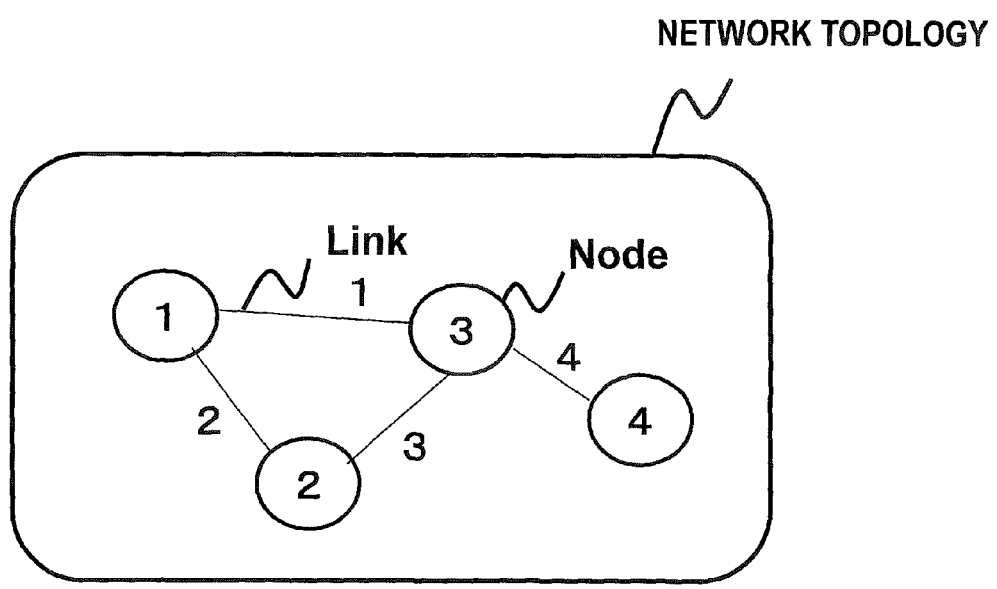
FIG. 22 illustrates a graphic display of a network topology according to the fourth exemplary embodiment of the present disclosure.

FIG. 21 illustrates a configuration according to the fourth exemplary embodiment. The visualization DB operation logic unit 11B in FIG. 21 acquires topology information from the network DB 2 and displays a connection relationship of nodes and links on a display device. For example, as illustrated in FIG. 22, the visualization DB operation logic unit 11B graphically displays a network topology. A number allocated to each node represents an identifier of the node. In addition, a number allocated to each link represents an identifier of the link. When the network DB 2 notifies the visualization DB operation logic unit 11B of change of the topology information, based on this notification, the visualization DB operation logic unit 11B acquires node and link information from the network DB 2 and changes the displayed connection relationship of nodes and links.

Figure 23:
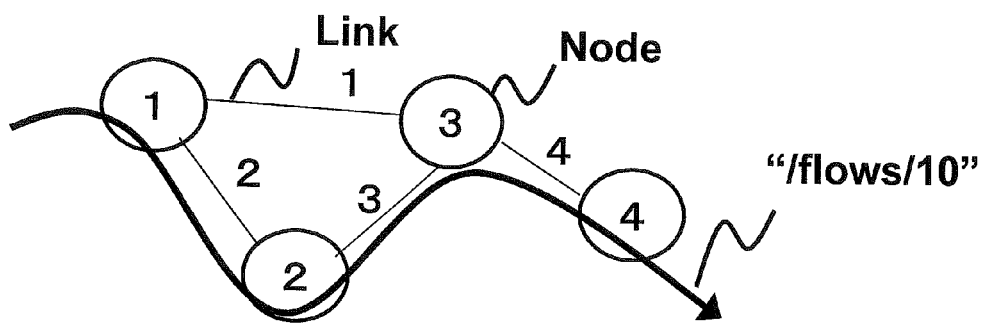
FIG. 23 illustrates a graphic display of packet processing information according to the fourth exemplary embodiment of the present disclosure.

In this way, by connecting the visualization DB operation logic unit 11B in FIG. 21 to the network DB 2, the operator can acquire a configuration of the management target network as visual information. In addition, the visualization DB operation logic unit 11B can graphically display packet processing information in the network DB 2. For example, the visualization DB operation logic unit 11B superimposes path information (Path) included in the entry "/flows/[flow_id]" on the graphically-displayed topology. FIG. 23 illustrates graphically-displayed packet processing information. In FIG. 23, an entry "/flows/10" having identifier "10" is graphically displayed. Information about the nodes and links through which packets travel and information about the direction in which the packets are forwarded are graphically displayed.

Figure 24:
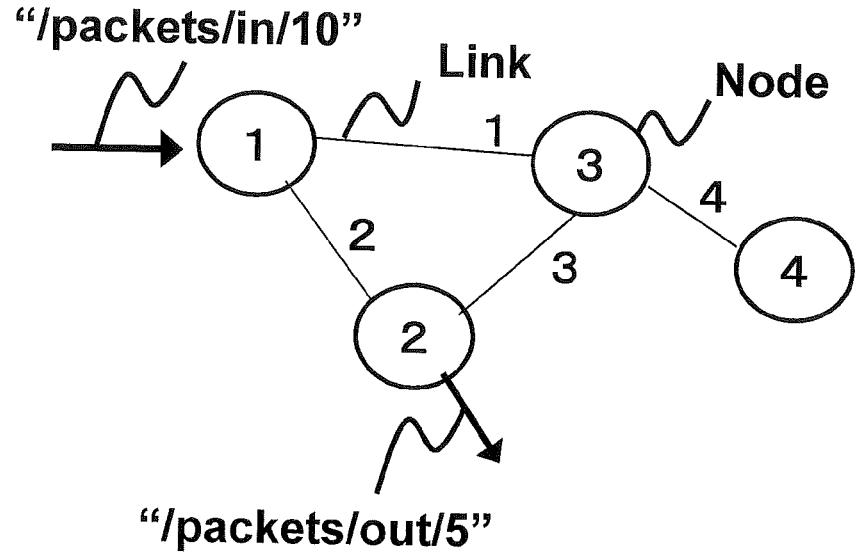
FIG. 24 illustrates a graphic display of packet input and output information according to the fourth exemplary embodiment of the present disclosure.

As illustrated in FIG. 24, the visualization DB operation logic unit 11B can graphically display the entries "/packets/in/[packet_id]" and "/packets/out/[packet_id]".

<Fifth Exemplary Embodiment>

Next, a fifth exemplary embodiment of the present disclosure will be described. In the fifth exemplary embodiment, an example in which the control apparatus 1 operates the network DB 2 by using a slice logic unit 11C.

Figure 25:
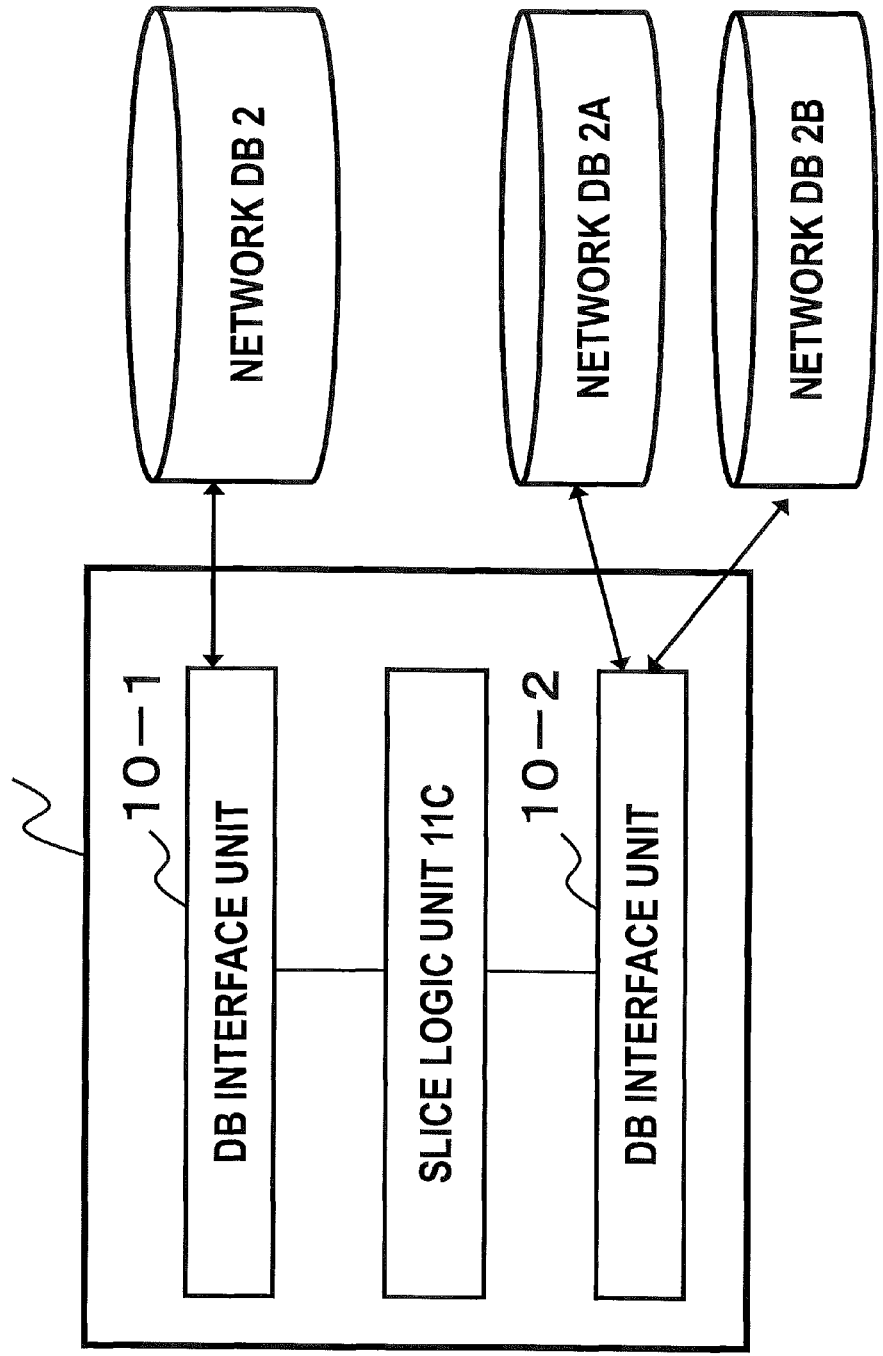
FIG. 25 illustrates a configuration of a system according to a fifth exemplary embodiment of the present disclosure.

FIG. 25 illustrates a configuration according to the fifth exemplary embodiment. The slice logic unit 11C in FIG. 25 has a function of duplicating the network DB 2 to execute network slicing (virtual division). The slice logic unit 11C expands a state or change of a single network DB 2 to a plurality of network DBs 2A and 2B and feeds a state or change of the plurality of network DBs 2A and 2B back to the original network DB 2. In FIG. 25, the control apparatus 1 includes two network DB interface units 10-1 and 10-2. However, a network DB interface unit may be arranged for each network DB. Alternatively, a single network DB interface unit may be connected to a plurality of network DBs 2.

As described above, by connecting the slice logic unit 11C to arbitrary network DBs 2, each of a plurality of network operators (network users) can manage a sliced network as a dedicated network. For example, a superior network operator can manage the network DB 2 and subordinate network operators permitted by the superior network operator can manage the network DBs 2A and 2B.

<Sixth Exemplary Embodiment>

Next, a sixth exemplary embodiment of the present disclosure will be described. In the sixth exemplary embodiment, an example in which the control apparatus 1 operates the network DB 2 by using a shortest path logic unit 11D will be described. The shortest path logic unit 11D has a function of calculating the shortest path among the paths from a packet forwarding source to destination in the network 4.

Figure 26:
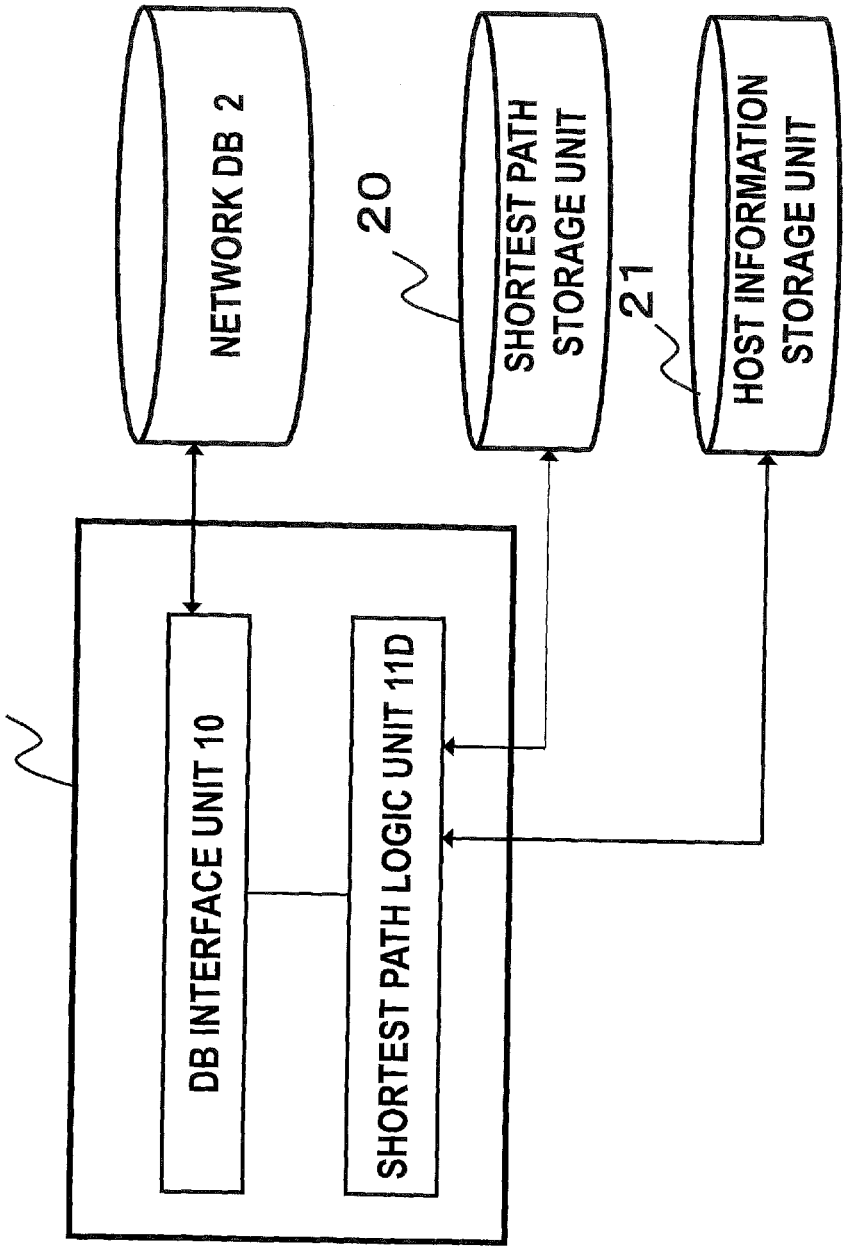
FIG. 26 illustrates a configuration of a system according to a sixth exemplary embodiment of the present disclosure.

FIG. 26 illustrates a configuration according to the sixth exemplary embodiment. Based on topology information acquired from the network DB 2 and host information read from a host information storage unit 21, the shortest path logic unit 11D in FIG. 26 calculates the shortest forwarding path between arbitrary hosts and stores the shortest forwarding path in a shortest path storage unit 20.

When the network DB 2 notifies the shortest path logic unit 11D of updating of a topology-related entry, based on the content of the updating, the shortest path logic unit 11D recalculates the shortest path and updates the shortest path storage unit 20. For example, the shortest path logic unit 11D uses the command "subscribe", so that, if the entry "/nodes" or "/links" is updated, the network DB 2 notifies the shortest path logic unit 11D of the updated information.

If an entry specified by the command "subscribe" is updated, the network DB 2 uses the command "publish" to notify the shortest path logic unit 11D of information about the entry. When receiving a notification about updating of topology information from the network DB 2, the shortest path logic unit 11D recalculates the shortest path corresponding to the new topology information and stores the shortest path in the shortest path storage unit 20. The shortest path logic unit 11D may update packet processing information when recalculating the shortest path. For example, path information ("Path information") included in the packet processing information is updated when recalculating the shortest path. For example, the shortest path logic unit 11D uses the command "put" to store the updated packet processing information in the entry "/flows/[flow_id]" in the network DB 2.

As described above, by connecting the control apparatus 1 having the shortest path logic unit 11D in FIG. 26 to the network DB 2, a function of calculating the shortest path and a function of updating packet processing information corresponding to this shortest path are added to the control apparatus 1.

<Seventh Exemplary Embodiment>

Next, a seventh exemplary embodiment of the present disclosure will be described. In the seventh exemplary embodiment, an example in which the control apparatus 1 operates the network DB 2 by using an aggregation logic unit 11E will be described. The aggregation logic unit 11E has a function of aggregating a plurality of nodes and a plurality of links to abstract a network topology.

Figure 27:
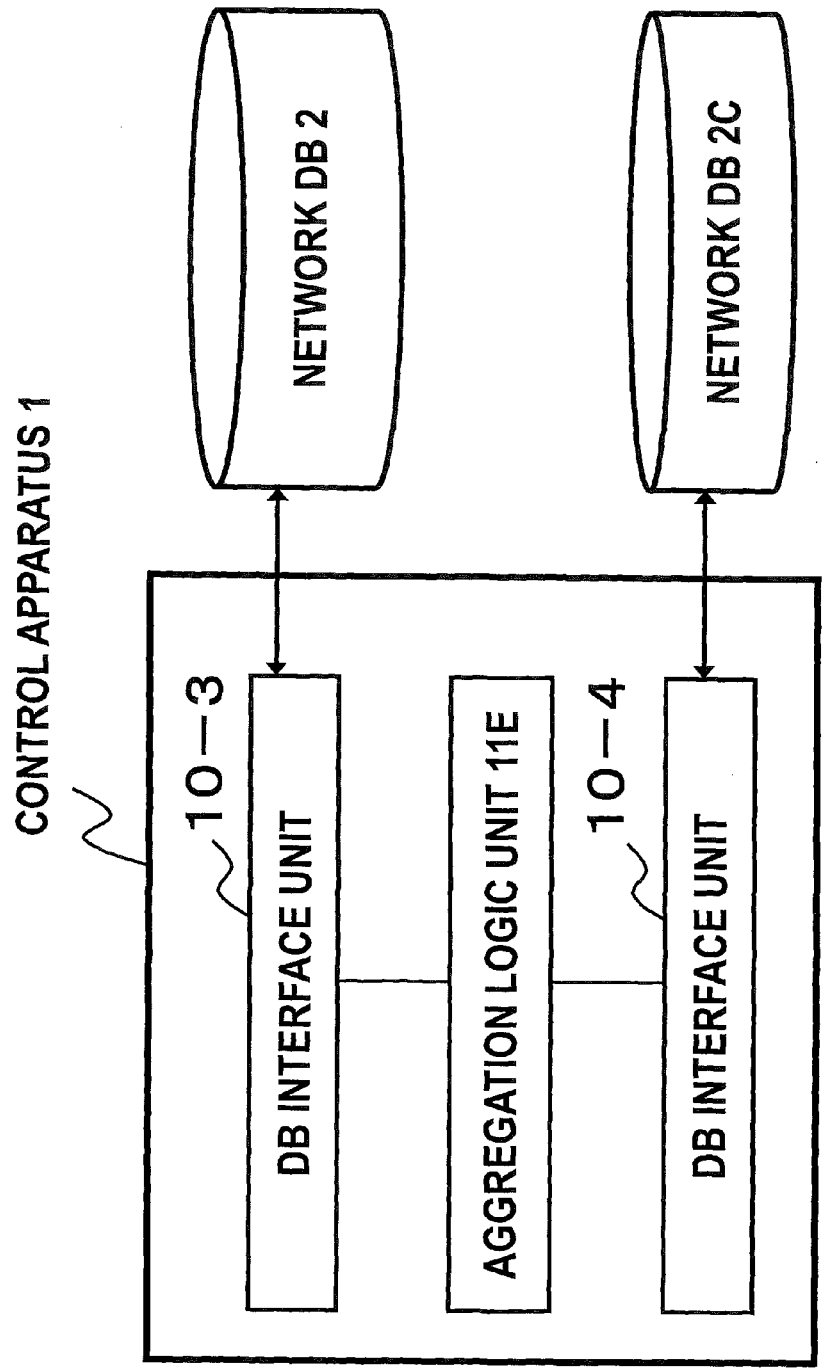
FIG. 27 illustrates a configuration of a system according to a seventh exemplary embodiment of the present disclosure.

FIG. 27 illustrates a configuration according to the seventh exemplary embodiment. For example, the aggregation logic unit 11E in FIG. 27 abstracts topology information stored in the network DB 2 and stores the abstracted topology information in a network DB 2C.

For example, the aggregation logic unit 11E operates the network DBs 2 and 2C via DB interface units 10-3 and 10-4, respectively.

Figure 28:
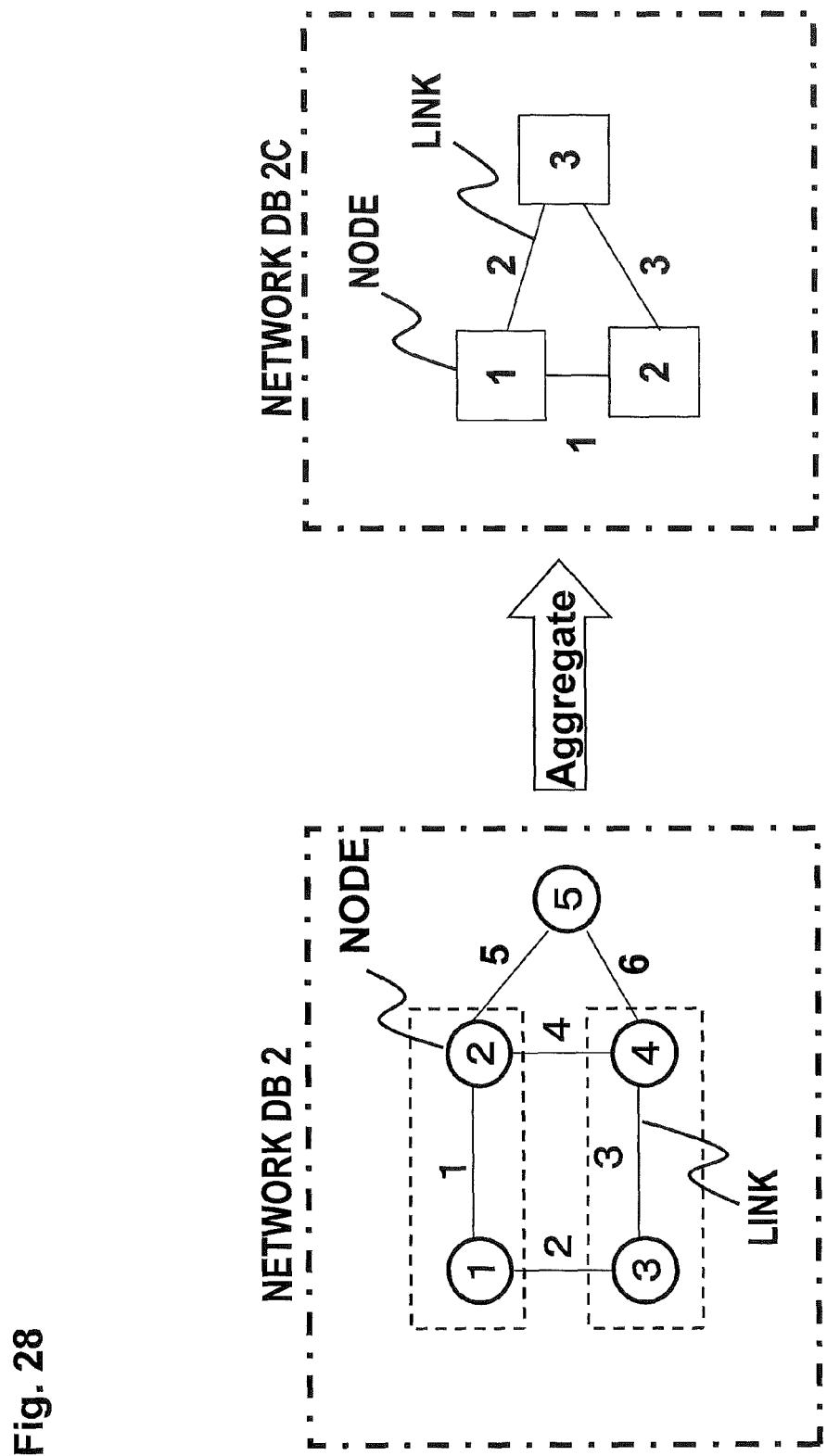
FIG. 28 illustrates an operation of network DBs by an aggregation logic unit according to the seventh exemplary embodiment of the present disclosure.

FIG. 28 outlines an operation in which the aggregation logic unit 11E abstracts topology information in the network DB 2 and stores the abstracted topology information in the network DB 2C. For example, the aggregation logic unit 11E abstracts topology information in accordance with an operation by an operator. In FIG. 28, among the topology information stored in the network DB 2, the aggregation logic unit 11E aggregates and abstracts nodes 1 and 2 and aggregates and abstracts nodes 3 and 4. A new node generated by aggregating the nodes 1 and 2 corresponds to a node 1 that is stored in the network DB 2C. A new node generated by aggregating the nodes 3 and 4 corresponds to a node 2 that is stored in the network DB 2C.

FIGS. 29 and 30 illustrate entries in the network DBs 2 and 2C, respectively. The aggregation logic unit 11E aggregates entries "/nodes/1" and "/nodes/2" in FIG. 29. In addition, the aggregation logic unit 11E aggregates entries "/nodes/3" and "/nodes/4" in FIG. 29. By these aggregation operations, the number of nodes to be stored in the network DB 2C is abstracted to "3."

For example, the aggregation logic unit 11E uses the command "push" to add three abstracted nodes to the entry "/nodes" in the network DB 2C. As illustrated in FIG. 30, by the aggregation operations, data (Value) of the entry "/nodes" in the network DB 2C is updated to "{1,2,3}". For example, the aggregation logic unit 11E uses the command "put" to store information about each of the abstracted nodes in the entry "/nodes/[node_id]" in the network DB 2C. For example, the aggregation logic unit 11E registers IDs ("node ID" in FIGS. 29 and 30) used when the control apparatus 1 controls the nodes in the entry "/nodes/[node_id]". In addition, if a node that is registered in the entry "/nodes/[node_id]" is an abstracted node, the aggregation logic unit 11E registers an ID before the node is abstracted ("original" in FIG. 30) in the entry "/nodes/[node_id]".

In FIG. 30, "node ID(a)" and "node ID(b)" are allocated as the IDs of the two nodes generated by the abstraction. In addition, a node corresponding to an entry "/nodes/5" in the network DB 2 is registered in an entry "/nodes/3" in the network DB 2C. "node ID(c)" is allocated as the node ID of the entry "/nodes/3" in the network DB 2C.

For example, the aggregation logic unit 11E also aggregates corresponding links when aggregating nodes. For example, in FIGS. 29 and 30, the aggregation logic unit 11E aggregates links corresponding to "/links/2" and "/links/4" in FIG. 29 to "/links/1" in FIG. 30. For example, the aggregation logic unit 11E uses the command "put" to store data (Value) corresponding to "/links/2" and "/links/4" in FIG. 29 in the entry "/links/1" in the network DB 2C. In addition, the aggregation logic unit 11E does not register the link ("/links/1" in FIG. 29), which has been made no longer necessary by the aggregation of "/nodes/1" and "/nodes/2" in FIG. 29, in the network DB 2C. For example, in FIG. 29, "{src_node: A, dst_node: B}" represents a link in which a packet is forwarded from the node having a node ID(A) to the node having a node ID(B).

As described above, the aggregation logic unit 11E can abstract a topology. Namely, an operator can control a management target network based on an abstracted topology and can easily manage the network.

<Eighth Exemplary Embodiment>

Next, an eighth exemplary embodiment of the present disclosure will be described. In the eighth exemplary embodiment, an example in which the control apparatus 1 operates the network DB 2 by using an integration logic unit 11F will be described. The integration logic unit 11F has a function of integrating topology information included in a plurality of network DBs.

Figure 31:
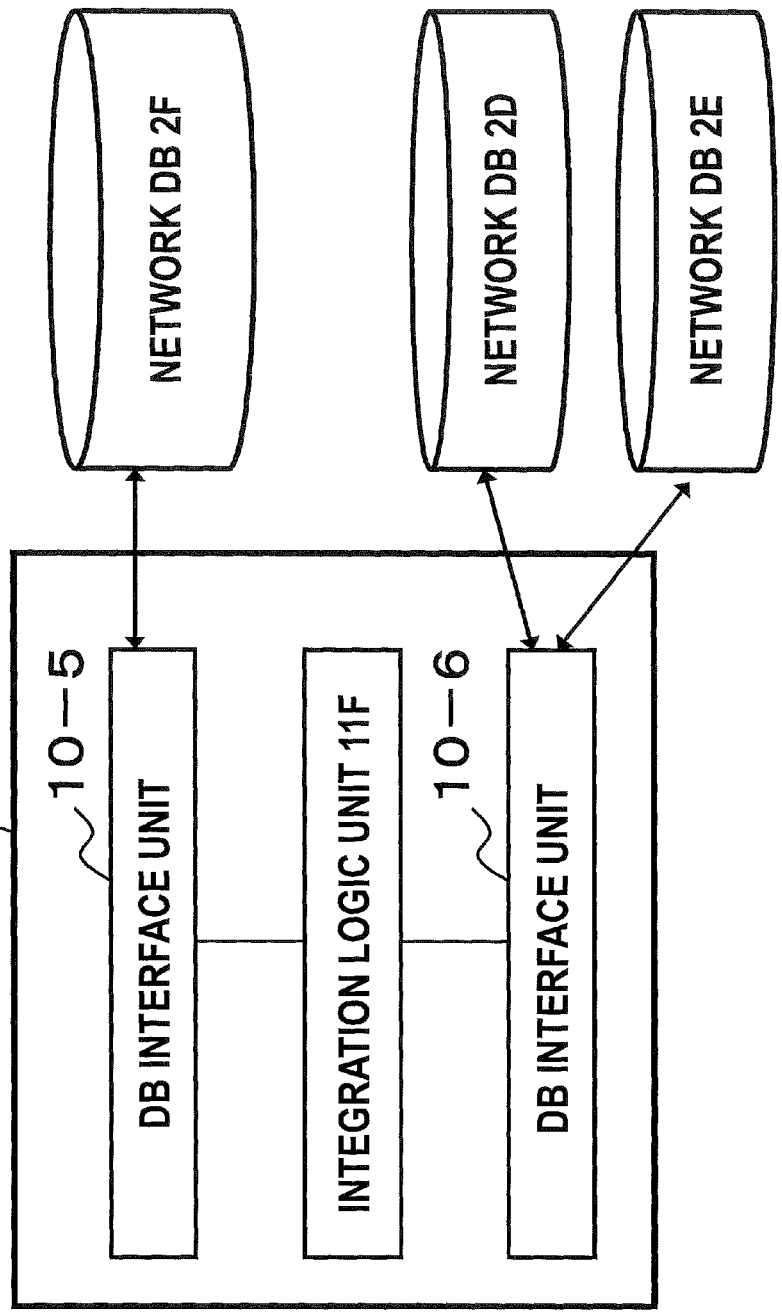
FIG. 31 illustrates a configuration of a system according to an eighth exemplary embodiment of the present disclosure.

FIG. 31 illustrates a configuration according to the eighth exemplary embodiment. The integration logic unit 11F in FIG. 31 integrates topology information included in network DBs 2D and 2E and stores the integrated topology information in a network DB 2F.

FIG. 32 illustrates topology information stored in the network DB 2D and information stored in the network DB 2E. The network DB 2D includes topology information configured by three nodes (nodes 1-3) and three links (links 1-3). The network DB 2E includes topology information configured by three nodes (nodes 1-3) and three links (links 1-3).

FIG. 33 illustrates new topology information generated by integrating the topology information in the network DBs 2D and 2E.

As illustrated in FIGS. 32 and 33, by integrating the two topologies, six nodes are stored in the network DB 2F. For example, the integration logic unit 11F uses the command "push" to store the node list in the entry "/nodes". By causing the integration logic unit 11F to operate the network DB 2F with the command "push", the list of integrated nodes ("{1,2,3,4,5,6}") is stored in the entry "/nodes". In addition, for example, the integration logic unit 11F uses the command "put" to store information about the nodes in the entry "/nodes/[node_id]".

As illustrated in FIGS. 32 and 33, by integrating the two topologies, seven links are stored in the network DB 2F. For example, the integration logic unit 11F uses the command "push" to store the link list in the entry "/links". By causing the integration logic unit 11F to operate the network DB 2F with the command "push", the list of integrated nodes ("{1,2,3,4,5,6,7}") is stored in the entry "/links". In addition, for example, the integration logic unit 11F uses the command "put" to store information about the links in the entry "/links/[link_id]".

<Ninth Exemplary Embodiment>

Next, a ninth exemplary embodiment of the present disclosure will be described. An operator can manage network DBs 2 or DB operation logic units 11 (or the components 11A-11F described in the third to eighth exemplary embodiments) by using functions of a component manager 30. The component manager 30 will be described in the ninth exemplary embodiment.

Figure 34:
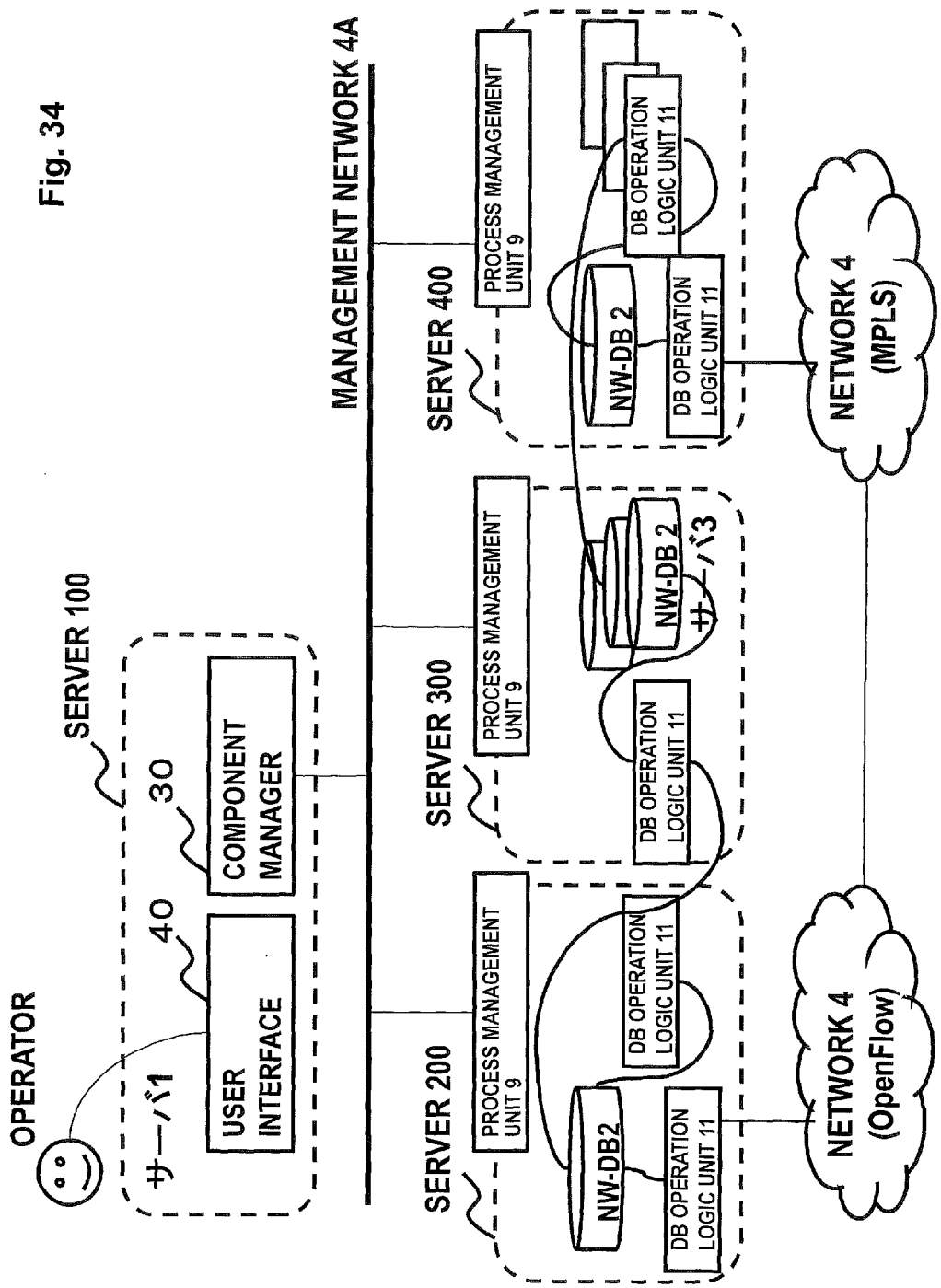
FIG. 34 illustrates a configuration of a system according to a ninth exemplary embodiment of the present disclosure.

FIG. 34 illustrates a configuration of a system according to the ninth exemplary embodiment. An operator manages network DBs 2 and DB operation logic units 11 by using functions of the component manager 30. In addition, as illustrated in FIG. 34, even when network DBs 2 and DB operation logic units 11 are arranged in a plurality of servers (servers 200 to 400), the component manager 30 can integrally manage the network DBs 2 and DB operation logic units 11. In FIG. 34, control apparatuses 1 are configured by network DBs 2 and DB operation logic units 11 arranged in a plurality of servers.

Figure 35:
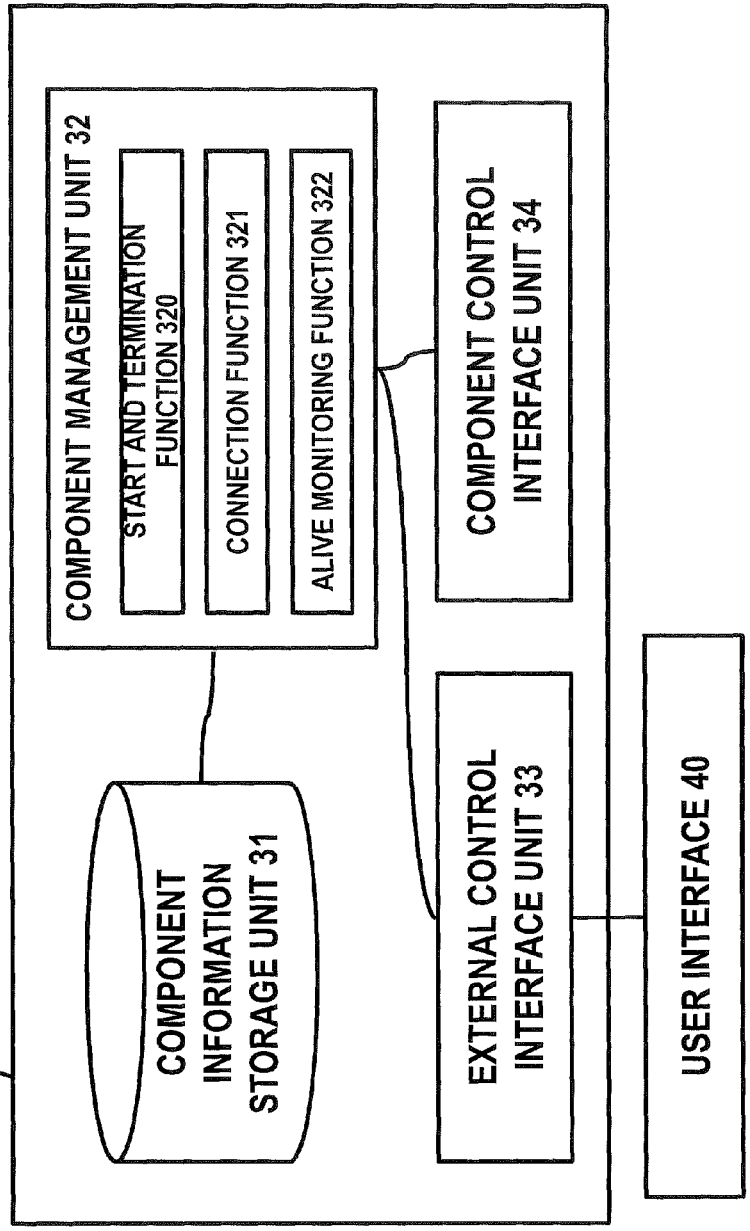
FIG. 35 illustrates a configuration of a component manager of a control apparatus according to the ninth exemplary embodiment of the present disclosure.

FIG. 35 illustrates a configuration of the component manager 30. In FIG. 35, the component manager 30 includes a component information storage unit 31, a component management unit 32, an external control interface unit 33, and a component control interface unit 34.

The component information storage unit 31 stores configurations and connection relationships of the network DBs and the DB operation logic units 11 described in the above exemplary embodiment (for example, the components 11A-11F described in the third to eighth exemplary embodiments).

The component control interface unit 34 has a function as an interface for connection to the network DBs 2, the DB operation logic units 11, and the like. The component manager 30 accesses the network DBs 2 and the DB operation logic units 11 via the component control interface unit 34.

The component management unit 32 has a start and termination function 320 for generating and deleting a network DB 2 and for starting and terminating a DB operation logic unit 11 in response to an operation from an operator. The component management unit 32 has a connection function 321 for connecting components via the component control interface unit 34 in response to an operation from an operator. The component management unit 32 includes an alive monitoring function 322 for monitoring whether the DB operation logic units 11 are properly operating. In addition, the component management unit 32 updates a content of the component information storage unit 31 based on an operation from the operator.

Process management units 9 in FIG. 34 are connected to the component control interface unit 34. For example, if DB operation logic units 11 are configured on a plurality of servers as illustrated in FIG. 34, the process management units 9 execute management operations, including starting, terminating, and monitoring the DB operation logic units 11 that operate on these servers, based on instructions from the component management unit 32. In addition, as illustrated in FIG. 34, the plurality of DB operation logic units 11 may be connected to different networks (for example, an OpenFlow network and an MPLS (Multi-Protocol Label Switching) network).

<Tenth Exemplary Embodiment>

Figure 36:
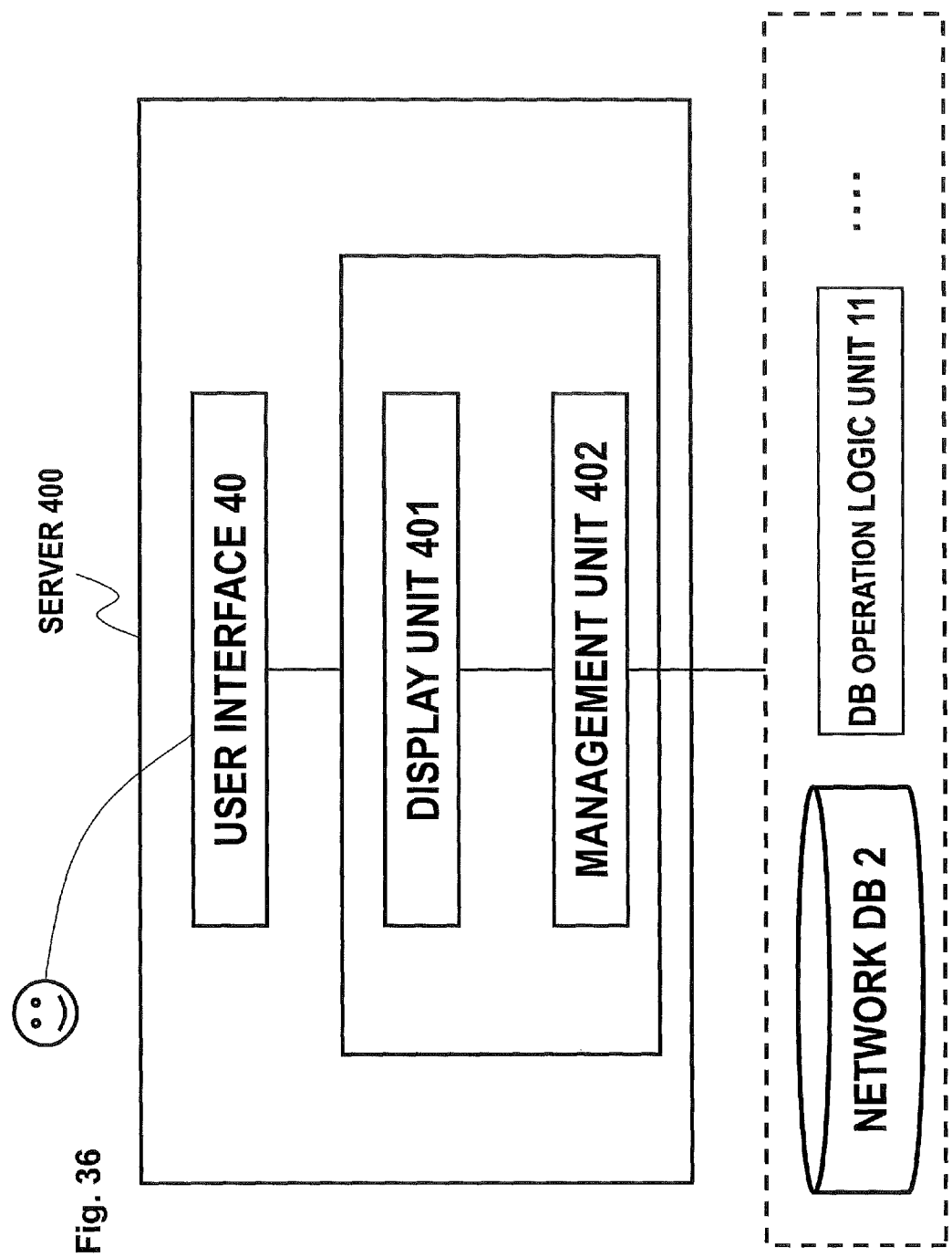
FIG. 36 illustrates a configuration of a system according to a tenth exemplary embodiment of the present disclosure.

Next, a tenth exemplary embodiment of the present disclosure will be described. FIG. 36 illustrates a configuration of a system according to the tenth exemplary embodiment of the present disclosure. Hereinafter, a user interface 40 in FIG. 36 will be described with reference to the drawings.

A server 400 illustrated in FIG. 36 has a function of configuring the control apparatus 1 based on an operation of the user interface 40 used by an operator.

The server 400 includes a display unit 401 and a management unit 402. The display unit 401 has a function of displaying icons corresponding to a network DB 2 and DB operation logic units 11 on the user interface 40 (for example, on a screen displayed on a display). The management unit 402 has a function of configuring the control apparatus 1 based on a connection relationship of icons operated by an operator.

Figure 37:
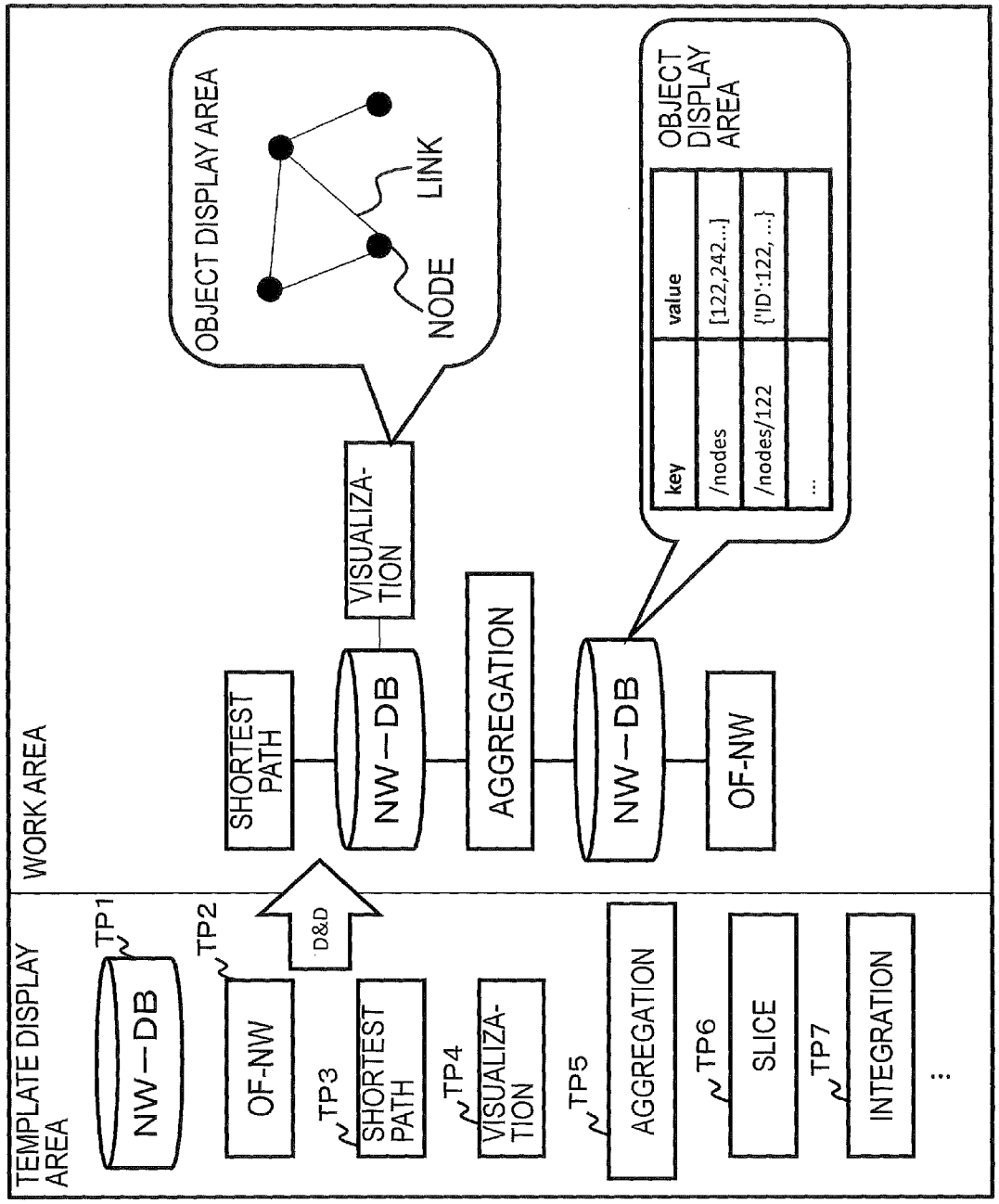
FIG. 37 illustrates a screen displayed on a display unit according to the tenth exemplary embodiment of the present disclosure.

FIG. 37 illustrates a screen displayed by the display unit 401. The screen in FIG. 37 has a layout including a template display area displaying template icons corresponding to the above network DB 2 and DB operation logic units 11 (for example, the components 11A-11F described in the third to eighth exemplary embodiments) and a work area.

For example, if an operator drags and drops templates corresponding to necessary network DBs 2, DB operation logic units 11, and the shortest path logic unit 11D from the template display area in FIG. 37, corresponding icons are displayed in the work area. If an operator connects icons displayed in the work area, a connection line is displayed between the icons in the work area. For example, when the display unit 401 receives a display request from an operator, detailed information about a network DB 2 or a DB operation logic unit 11 or a network topology generated by the visualization DB operation logic unit 11B is displayed in an object display area using a pop-up window or the like. For example, when the display unit 401 detects a click or the like (display request) on an icon in the work area, detailed information about a network DB 2 or a DB operation logic unit 11 or a network topology generated by the visualization DB operation logic unit 11B is displayed in the object display area using a pop-up window or the like.

Figure 38:
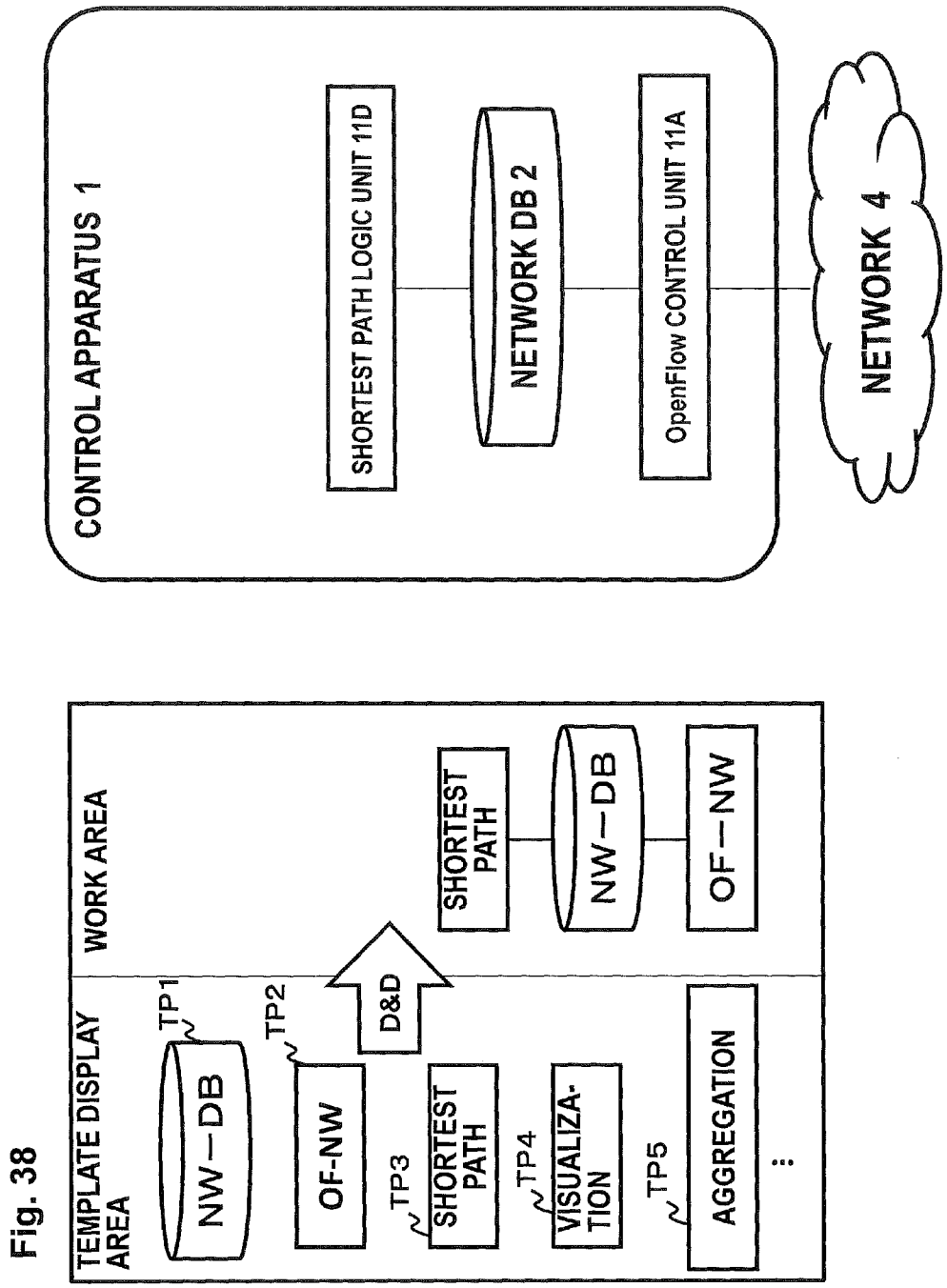
FIG. 38 illustrates a correspondence relationship between a user operation content and a control apparatus configuration according to the tenth exemplary embodiment of the present disclosure.

FIG. 38 is a diagram in which an operation executed via the user interface 40 and a configuration of the control apparatus 1 configured by the management unit 402 are associated with each other. The management unit 402 can be configured by the component manager 30.

For example, the display unit 401 may display operation results of the network DB 2 by a DB operation logic unit 11. For example, if an icon corresponding to a DB operation logic unit 11 and an icon corresponding to a network DB 2 are connected to each other, the display unit 401 displays operation results of the network DB 2 by the DB operation logic unit 11.

FIG. 38 illustrates a state in which an icon (NW-DB; corresponding to a network DB 2) TP1, an icon (OF-NW; corresponding to the OpenFlow control unit 11A) TP2, and an icon (shortest path; corresponding to the shortest path logic unit 11D) TP3 have been selected from the template display area. These icons are arranged and connected to each other in the work area. In this way, the network DB 2, the OpenFlow control unit 11A, and the shortest path logic unit 11D are added and connected to the control apparatus 1. The network 4 corresponding to the network DB 2 is controlled by the OpenFlow protocol, and shortest path control is executed on the network 4.

Figure 39:
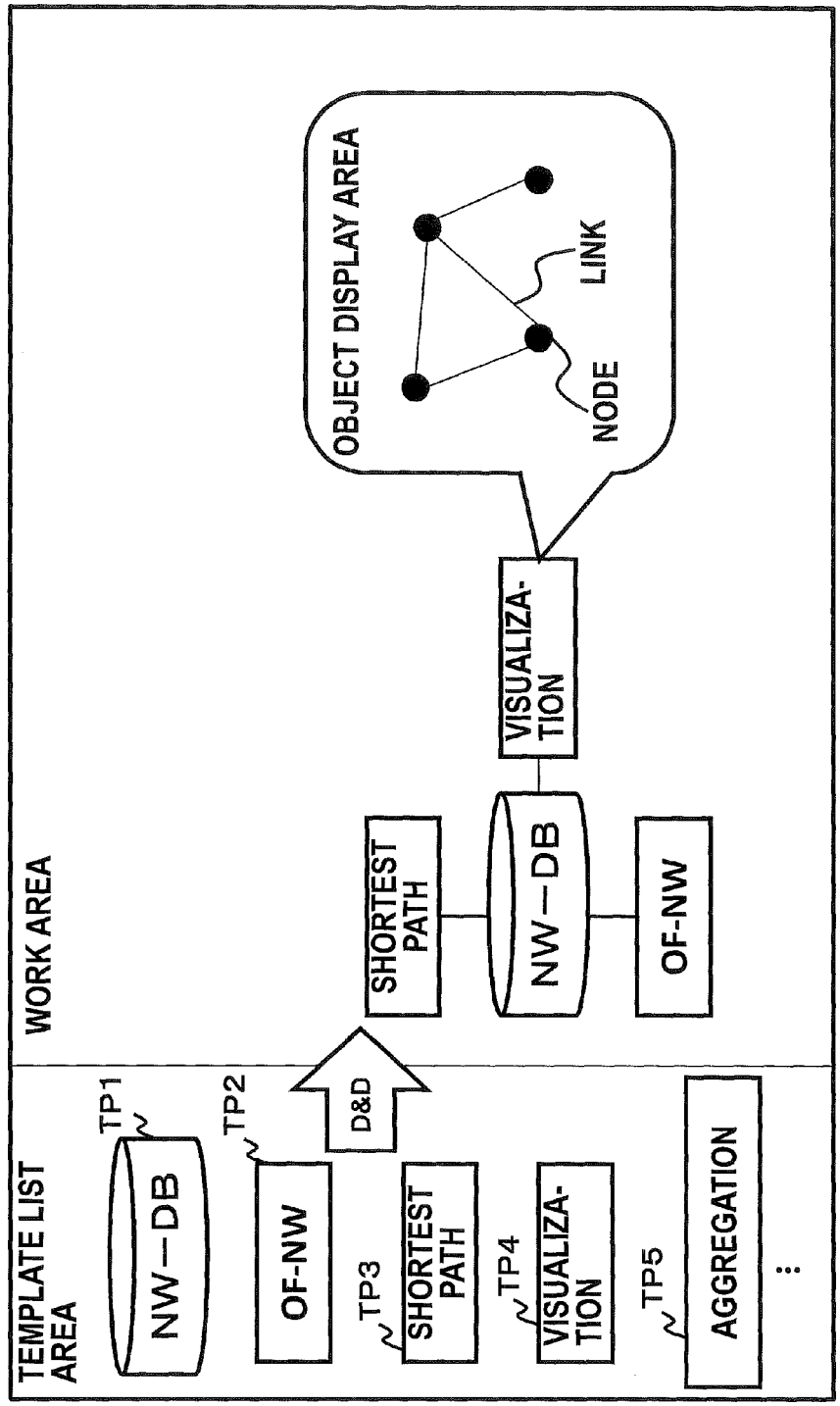
FIG. 39 illustrates a correspondence relationship between a user operation content and a control apparatus configuration according to the tenth exemplary embodiment of the present disclosure.

FIG. 39 is a diagram in which an icon (visualization; corresponding to the visualization DB operation logic unit 11B) TP4 is connected to the icon (NW-DB; corresponding to the network DB 2) TP1 in FIG. 38. In this way, a network topology display function using a graph or the like is added to the control apparatus 1.

Figure 40:
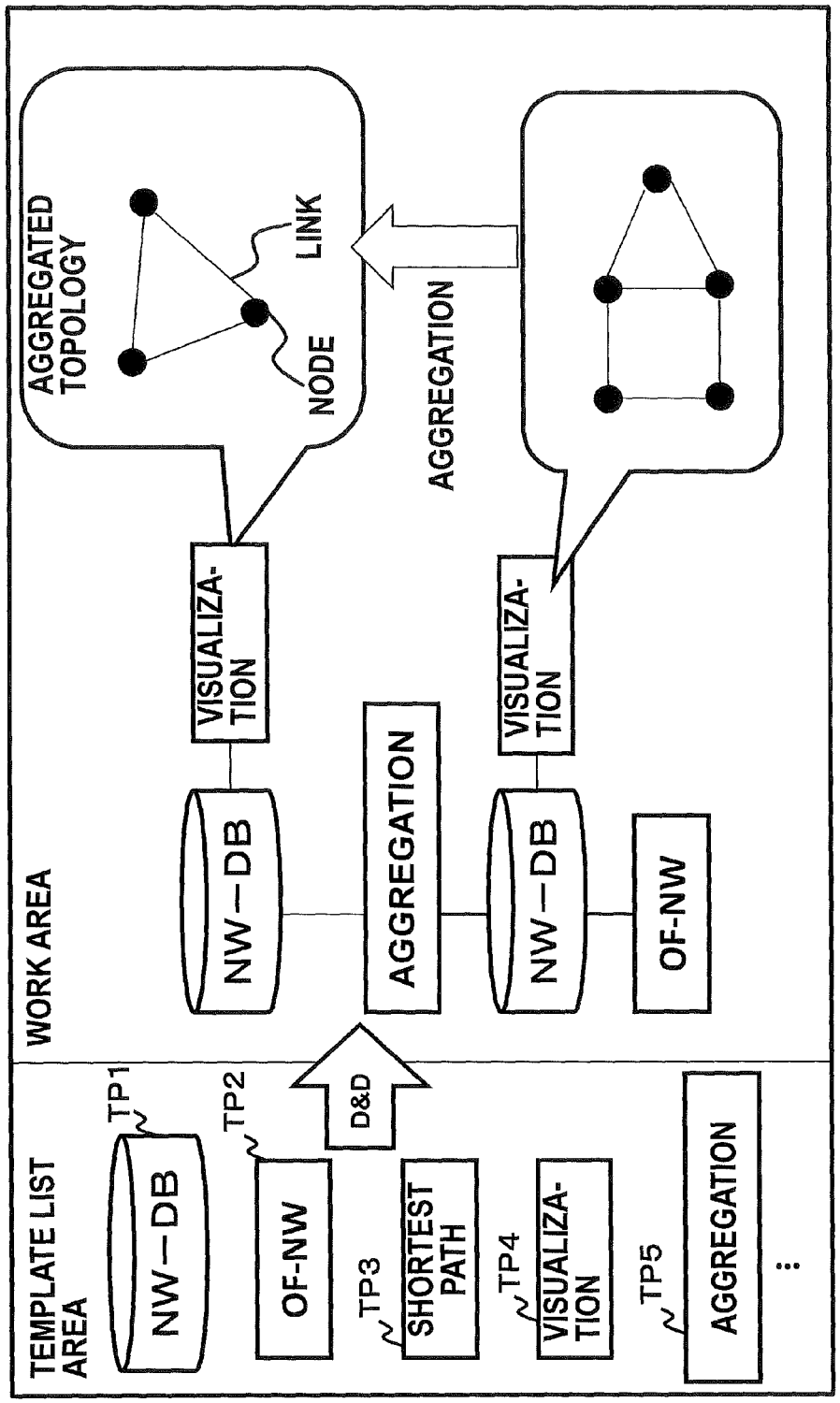
FIG. 40 illustrates a correspondence relationship between a user operation content and a control apparatus configuration according to the tenth exemplary embodiment of the present disclosure.

FIG. 40 is a graph in which an icon (aggregation; the aggregation logic unit 11E) TP5 is additionally connected to the icon (NW-DB) TP1 to which the icon (OF-NW) TP2 is connected. The aggregation logic unit 11E corresponding to the icon (aggregation) TP5 aggregates and abstracts topology information in the network DB and stores the information in another network DB 2. The icon (visualization) TP5 is connected to each network DB 2. As illustrated in FIG. 40, both a complex network topology and an abstracted network topology can be displayed as graphs.

Figure 41:
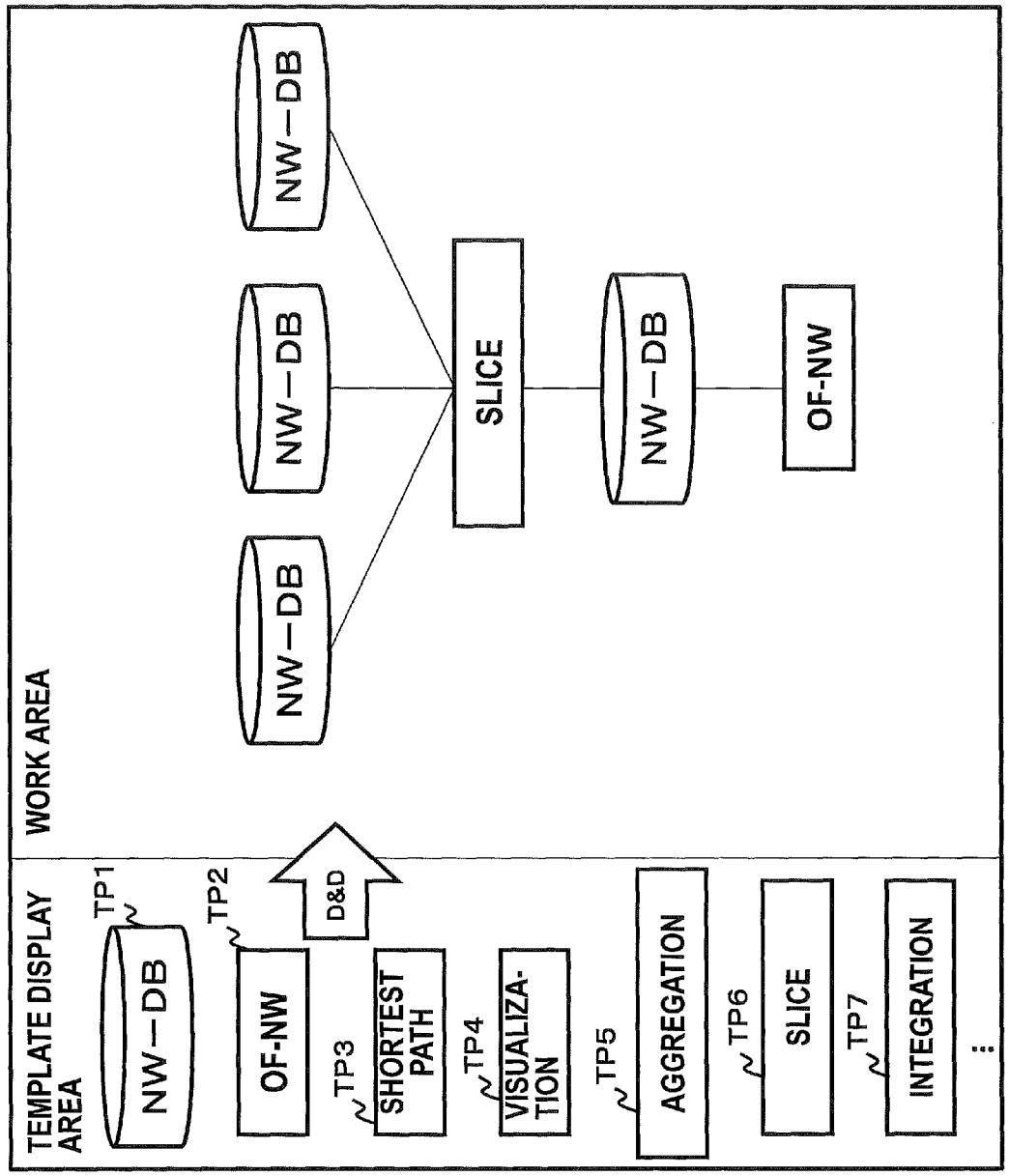
FIG. 41 illustrates a correspondence relationship between a user operation content and a control apparatus configuration according to the tenth exemplary embodiment of the present disclosure.

FIG. 41 is a graph in which an icon (slice; corresponding to the slice logic unit 11C) TP6 is additionally connected to the icon (NW-DB) TP1 to which the icon (OF-NW) TP2 is connected and logically-divided network DBs are generated. In this way, a single network can be sliced to a plurality of virtual networks. In addition, by connecting various icons in the template display area to the icons (NW-DB; network DBs) representing these sliced network DBs, the sliced networks can be controlled and used individually.

Figure 42:
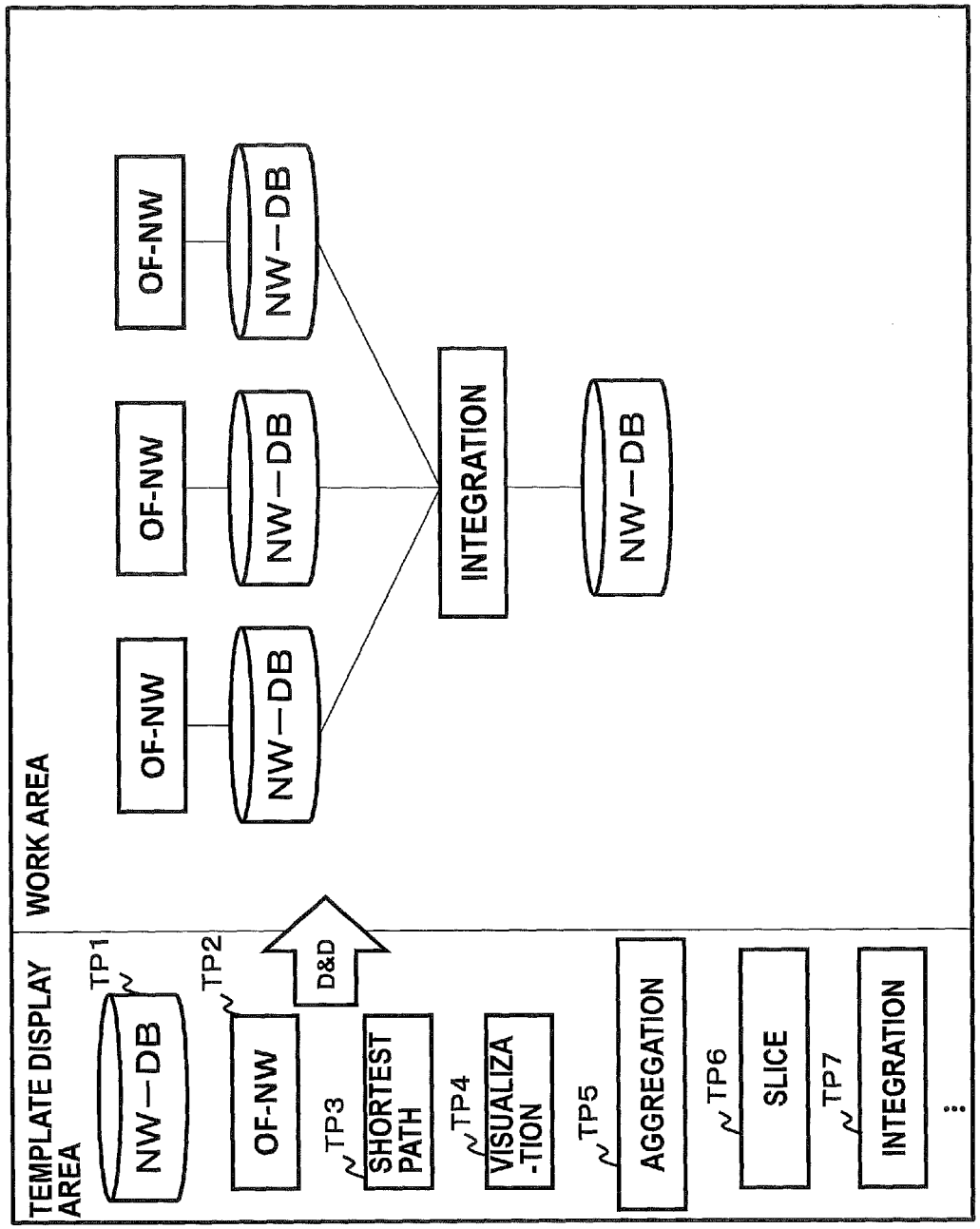
FIG. 42 illustrates a correspondence relationship between a user operation content and a control apparatus configuration according to the tenth exemplary embodiment of the present disclosure.

FIG. 42 is a graph in which an icon (integration; corresponding to the integration logic unit 11F) TP7 is connected to a plurality of icons (NW-DB) TP1 to which icons (OF-NW) TP2 are connected and a network DB integrating these networks is generated. In this way, a plurality of networks can be controlled and used as a single network.

As described above, by using the user interface according to the present exemplary embodiment, an operator can customize initial settings or functions of the network control apparatus, without advanced knowledge and skill. In addition, an operator may be allowed to set each network, refer to an entry of a network DB, and operate an entry via this user interface 40. For example, it is preferable that an operator be allowed to modify a setting value or add, change, or delete an entry relating to a control (flow) operation by moving a cursor to a field in the object display area in FIG. 37.

While exemplary embodiments of the present disclosure have thus been described, the present invention is not limited thereto. Further modifications, substitutions, or adjustments can be made without departing from the basic technical concept of the present invention. For example, the network configurations or the component configurations in each drawing are merely used to facilitate understanding of the present invention. Namely, the present invention is not limited to these configurations in the drawings.

In addition, for example, other than the variations of the DB operation logic unit 11 described in the above exemplary embodiments, a network extraction logic is applicable. With such logic, by partially extracting a topology of a single network DB and expanding the extracted topology to another network DB, a flow of the network DB can be expanded to a flow of the original network DB. By connecting two network DBs in this way, a function of partially controlling a network is added to the network control apparatus. For example, another network operator can be allowed to operate only a part of a network or the routing algorithm of only that part can be changed.

In addition, while the above exemplary embodiments have been described assuming that a real network is controlled, a network control unit that links with a network simulator such as NS3 (Network Simulator version3) may be arranged. In this way, the network control apparatus can control not only a real physical network but also a network on a simulator. Thus, a network operator can test operations or performance of a network control apparatus created thereby on a simulator before applying the control apparatus to a real physical network.

Finally, preferable modes of the present invention will be summarized.

<First Mode>

(See the Control Apparatus in the Above First Aspect)

<Second Mode>

In the control apparatus in the first mode, in accordance with an operation of information relating to a topology of the network responsive to the database operation command, the interface unit updates control information relating to the topology of the network.

<Third Mode>

In the control apparatus in the first or second mode, in accordance with an input of a database operation command for adding a node to the network, the interface unit adds information about the node to the control information.

<Fourth Mode>

In the control apparatus in any one of the first to third modes, in accordance with an input of a database operation command for deleting a node from the network, the interface unit deletes information about the node from the control information.

<Fifth Mode>

In the control apparatus in any one of the first to fourth modes, in accordance with an input of a database operation command for adding a link to the network, the interface unit adds information about the link to the control information.

<Sixth Mode>

In the control apparatus in any one of the first to fifth modes, in accordance with input of a database operation command for deleting a link from the network, the interface unit deletes information about the link from the control information.

<Seventh Mode>
(See the Control Method in the Above Second Aspect)
<Eighth Mode>
(See the Communication System in the Above Third Aspect)
<Ninth Mode>
(See the Program in the Above Fourth Aspect)

The entire disclosure of the above NPL is incorporated herein by reference thereto. Modifications and adjustments of the exemplary embodiments and examples are possible within the scope of the overall disclosure (including the claims) of the present invention and based on the basic technical concept of the present invention. Various combinations and selections of various disclosed elements (including the elements in each of the claims, exemplary embodiments, examples, drawings, etc.) are possible within the scope of the claims of the present invention. That is, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST 1 control apparatus
2, 2A to 2F network database (network DB)
3 node
4 network
4A management network
9 process management unit
10, 10-1 to 10-6 DB interface unit
11, 11-1, 11-2 DB operation logic unit
12 network control unit
11A OpenFlow control unit
11B visualization DB operation logic unit
11C slice logic unit
11D shortest path logic unit
11E aggregation logic unit
11F integration logic unit
20 shortest path storage unit
21 host information storage unit
30 component manager (configuration management unit)
31 component information storage unit
32 component management unit
33 external control interface unit
34 component control interface unit
40 user interface
100, 200, 300, 400 server
110 topology processing unit
111 flow processing unit
112 packet processing unit
320 start and termination function
321 connection function
322 alive monitoring function
401 display unit
402 management unit
TP1 to TP6 icon

What is claimed is:

1. A control apparatus controlling a network, the control apparatus comprising:
   a database which stores control information for controlling the network;
   an interface unit, implemented by one or more processors, that is connectable to a plurality of modules and operates the control information in response to a database operation command issued by one of the plurality of modules, wherein each of the plurality of modules operates the control information based on a predetermined algorithm, and a combination of the plurality of modules connected to the interface unit is configurable by an operator; and
   a control unit, implemented by the one or more processors, that controls packet processing in the network based on the control information configured by an operation executed by any one of the modules, wherein
   the interface unit updates the control information in response to a database operation command corresponding to information input/output or information deletion with respect to the control information, and
   by changing the combination of the modules, the operator configures the control apparatus suitable to a communication protocol used in the network.

2. The control apparatus according to claim 1,
   wherein in accordance with an operation of information relating to a topology of the network responsive to the database operation command, the interface unit updates control information relating to the topology of the network.

3. The control apparatus according to claim 1,
   wherein in accordance with an input of a database operation command for adding a node to the network, the interface unit adds information about the node to the control information.

4. The control apparatus according to claim 1,
   wherein in accordance with an input of a database operation command for deleting a node from the network, the interface unit deletes information about the node from the control information.

5. The control apparatus according to claim 1,
   wherein in accordance with an input of a database operation command for adding a link to the network, the interface unit adds information about the link to the control information.

6. The control apparatus according to claim 1,
   wherein in accordance with an input of a database operation command for deleting a link from the network, the interface unit deletes information about the link from the control information.

7. A method of a control apparatus for controlling a network, the method comprising:
   storing control information for controlling the network in a database;
   operating the control information in response to a database operation command issued by one of a plurality of modules, wherein the plurality of modules is connectable to an interface unit of the control apparatus, a combination of the plurality of modules connected to the interface unit is configurable by an operator, and each of the plurality of modules operates the control information based on a predetermined algorithm;

updating the control information in response to a database operation command corresponding to information input/output or information deletion with respect to the control information; and controlling packet processing in the network based on the control information configured by an operation executed by any one of the modules, wherein by changing the combination of the modules, the operator configures the control apparatus suitable to a communication protocol used in the network.

8. A communication system comprising a control apparatus for controlling a network, the control apparatus comprising:

a database which stores control information for controlling the network;

an interface unit, implemented by one or more processors, that is connectable to a plurality of modules and operates the control information in response to a database operation command issued by one of the plurality of modules, wherein each of the plurality of modules operates the control information based on a predetermined algorithm, and a combination of the plurality of modules connected to the interface unit is configurable by an operator; and a control unit, implemented by the one or more processors, that controls packet processing in the network based on the control information configured by an operation executed by any one of the modules, wherein the interface unit updates the control information in response to a database operation command corresponding to information input/output or information deletion with respect to the control information, and by changing the combination of the modules, the operator configures the control apparatus suitable to a communication protocol used in the network.

9. A non-transitory computer-readable recording medium storing a program which, when executed, causes one or more processors of a control apparatus to perform operations for controlling a network, the operations comprising:

storing control information for controlling the network in a database;

operating the control information in response to a database operation command issued by one of a plurality of modules, wherein the plurality of modules is connectable to an interface unit of the control apparatus, a combination of the plurality of modules connected to the interface unit is configurable by an operator, and each of the plurality of modules operates the control information based on a predetermined algorithm;

updating the control information in response to a database operation command corresponding to information input/output or information deletion with respect to the control information; and controlling packet processing in the network based on the control information configured by an operation executed by any one of the modules, wherein by changing the combination of the modules, the operator configures the control apparatus suitable to a communication protocol used in the network.

10. A control apparatus controlling a network, the control apparatus comprising:

a memory storing instructions and control information for controlling the network; and one or more processors connected to a plurality of modules, wherein the one or more processors are configured to execute the instructions to:

operate the control information in response to a database operation command issued by one of the plurality of modules, wherein each of the plurality of modules operates the control information based on a predetermined algorithm, and a combination of the plurality of modules connected to the interface unit is configurable by an operator;

control packet processing in the network based on the control information configured by an operation executed by any one of the modules;

update the control information in response to a database operation command corresponding to information input/output or information deletion with respect to the control information;

receive an input from the operator changing the combination of the modules; and configure the control apparatus, based on the input, to be suitable to a communication protocol used in the network.

* * * * *